US010728573B2

(12) United States Patent
Sun et al.

(10) Patent No.: US 10,728,573 B2
(45) Date of Patent: Jul. 28, 2020

(54) MOTION COMPENSATED BOUNDARY PIXEL PADDING

(71) Applicant: QUALCOMM Incorporated, San Diego, CA (US)

(72) Inventors: Yu-Chen Sun, Bellevue, WA (US); Yi-Wen Chen, San Diego, CA (US); Wei-Jung Chien, San Diego, CA (US); Li Zhang, San Diego, CA (US); Xiang Li, Los Gatos, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/123,747

(22) Filed: Sep. 6, 2018

(65) Prior Publication Data
US 2019/0082193 A1    Mar. 14, 2019

Related U.S. Application Data

(60) Provisional application No. 62/556,188, filed on Sep. 8, 2017.

(51) Int. Cl.
| | |
|---|---|
| *H04N 19/563* | (2014.01) |
| *H04N 19/176* | (2014.01) |
| *H04N 19/182* | (2014.01) |
| *H04N 19/82* | (2014.01) |
| *H04N 19/52* | (2014.01) |

(52) U.S. Cl.
CPC ......... *H04N 19/563* (2014.11); *H04N 19/176* (2014.11); *H04N 19/182* (2014.11); *H04N 19/82* (2014.11); *H04N 19/52* (2014.11)

(58) Field of Classification Search
CPC .. H04N 19/105; H04N 19/119; H04N 19/129; H04N 19/132; H04N 19/176; H04N 19/186; H04N 19/523; H04N 19/563
USPC ............ 375/240.01, 240.02, 240.08, 240.15, 375/240.16, 240.17
See application file for complete search history.

(56) References Cited

U.S. PATENT DOCUMENTS

| | | | | |
|---|---|---|---|---|
| 2006/0072669 A1* | 4/2006 | Lin | ...................... | H04N 19/563 |
| | | | | 375/240.24 |
| 2007/0086523 A1* | 4/2007 | Yan | ........................ | H04N 19/50 |
| | | | | 375/240.13 |
| 2015/0271512 A1* | 9/2015 | Sanghvi | .................. | H04N 19/43 |
| | | | | 375/240.16 |

OTHER PUBLICATIONS

Chen H., et al., "Description of SDR, HDR and 360° Video Coding Technology Proposal by Huawei, GoPro, HiSilicon, and Samsung","general application scenario", 10. JVET Meeting, Apr. 10, 2018-Apr. 20, 2018, San Diego, (The Joint Video Exploration Team of ISO/IEC JTC1/SC29/WG11 and ITU-T SG.16), URL:http://phenix.int-evry.fr/jvet/, No. JVET-J0025-v4, Apr. 14, 2018 (Apr. 14, 2018), XP030151192, pp. 132 Pages.

(Continued)

*Primary Examiner* — Dominic D Saltarelli
(74) *Attorney, Agent, or Firm* — Shumaker & Sieffert, P.A.

(57) ABSTRACT

A video coder, such as a video encoder or a video decoder, may use reference pixels in a first picture to pad pixels outside a picture boundary of a second picture. The second picture is a different picture from the first picture. The padded pixels are in a padding area surrounding the second picture. The video coder may encode or decode one or more blocks of the video data based on the padded pixels.

30 Claims, 12 Drawing Sheets

(56) References Cited

OTHER PUBLICATIONS

Chen J., et al., "Algorithm Description of Joint Exploration Test Model 6 (JEM 6)," Joint Video Exploration Team, (JVET) of ITU-T SG 16 WP 3 and ISO/IEC JTC 1/SC 29/WG 11, JVET-F1001-v2, Mar. 31-Apr. 7, 2017, 48 Pages.

Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.

Fangdong C., et al., "Two-Stage Picture Padding for High Efficiency Video Coding", 2016 Picture Coding Symposium (PCS), IEEE, Dec. 4, 2016 (Dec. 4, 2016), XP033086833, pp. 1-5.

International Search Report and Written Opinion of International Application No. PCT/US2018/049828, dated Nov. 22, 2018, 17 pp.

Li M., et al., "Rate-Distortion Criterion Based Picture Padding for Arbitrary Resolution Video Coding", 90, MPEG Meeting, Oct. 26, 2009-Oct. 30, 2009, XIAN, (Motion Picture Expert Group or ISO/IECJTC1/SC29/WG11), No. M17035, Oct. 23, 2009 (Oct. 23, 2009), XP030045625, 9 Pages.

Li M., et al., "Rate-Distortion Criterion Based Picture Padding for Arbitrary Resolution Video Coding Using H.264/MPEG-4 AVC", IEEE Transactions on Circuits and Systems for Video Technology, Institute of Electrical and Electronics Engineers, US, vol. 20, No. 9, Sep. 1, 2010 (Sep. 1, 2010), XP011315559, pp. 1233-1241.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Sullivan, et al., "Overview of the High Efficiency Video Coding (HEVC) Standard", IEEE Transactions on Circuits and Systems for Video Technology, IEEE Service Center, Piscataway, NJ, US, vol. 22 (12), Dec. 1, 2012, XP011486324, pp. 1649-1668.

"L1," Wikipedia.org, accessed on on Sep. 8, 2017, accessed from https://en.wikipedia.org/wiki/L1, 2 pp.

"Euclidean distance," Wikipedia.org, accessed on Sep. 8, 2017, accessed from https://en.wikipedia.org/wiki/Euclidean_distance, 4 pp.

Wang Y-K., et al., "High Efficiency Video Coding (HEVC) Defect Report", 14. JCT-VC Meeting; Jul. 25, 2013-Aug. 2, 2013; Vienna; (Joint Collaborative Team on Video Coding of ISO/IEC JTC1/SC29/WG11 and ITU-TSG.16 ); URL: http://wftp3.itu.int/av-arch/jctvc-site/,,No. JCTVC-N1003, Sep. 27, 2013 (Sep. 27, 2013), XP030114947, 311 pages.

Lin et al., "Motion Vector Coding in the HEVC Standard," IEEE Journal of Selected Topics in Signal Processing, vol. 7, No. 6, Dec. 2013, pp. 957-968.

ITU-T H.261, Line Transmission on Non-Telephone Signals, Video Codec for Audiovisual Services at Px64 kbits/s, The International Telegraph and Telephone Consultative Committee, Geneva, 1990, 32 pp.

ITU-T H.262, Series H: Audiovisual and Multimedia Systems Infrastructure of audiovisual services—Coding of moving video, Information Technology—Generic coding of moving pictures and associated audio information: Video, The International Telecommunication Union, Feb. 2000, 220 pp.

ITU-T H.263, Series H: Audiovisual and Multimedia Systems Infrastructure of audiovisual services—Coding of moving video, Video Coding for low bit rate communication, The International Telecommunication Union, Jan. 2005, 226 pp.

ITU-T H.264, Series H: Audiovisual and Multimedia Systems, Infrastructure of audiovisual services—Coding of moving viedo, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T VCEG (Q 6/16), "Affine Transform Prediction for Next Generation Video Coding," Huawei Technologies Co., Ltd., The International Telecommunication Union. Oct. 2015, 11 pp.

Chen et al., "Algorithm Description of Joint Exploration Test Model 1," Joint Video Exploration Team, (JVET) of ITU-T SG 16 WP 3 and ISO/IEC JTC 1/SC 29/WG 11, JVET-A1001, Oct. 19-21, 2015, 27pp.

Boyce J., et al., "JVET Common Test Conditions and Software Reference Configurations", Joint Video Experts Team (JVET) of ITU-T SG 16 WP 3 and ISO/IEC JTC 1/SC 29/WG 11, JVET-J1010-v1, Apr. 10-20, 2018, 4 pages.

Yang H., et al., "Description of Core Experiment 4 (CE4): Inter Prediction and Motion Vector Coding", 10. JVET Meeting; Apr. 10, 2018-Apr. 20, 2018; San Diego, No. JVET-J1024, Apr. 20, 2018 (Apr. 20, 2018), pp. 1-44, XP030151318.

Zhang Y., et al., "CE4.5.2: Motion Compensated Boundary Pixel Padding", Joint Video Exploration Team (JVET) of ITU-T SG 16 WP 3 and ISO/IEC JTC 1/SC 29/WG 11, JVET-K0363, Jul. 10-18, 2018, 3 pages.

* cited by examiner

FIG. 7D

MOTION COMPENSATED BOUNDARY PIXEL PADDING

This application claims the benefit of U.S. Provisional Patent Application 62/556,188, filed Sep. 8, 2017, the entire content of which is incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265 (High Efficiency Video Coding (HEVC)), ITU-T H.266 (Versatile Video Coding (VVC)), and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to boundary pixel padding. The techniques may be applied to any of the existing video codecs, such as HEVC (High Efficiency Video Coding, ITU-T H.265) or any future video coding standards.

In one example, this disclosure describes a method of decoding video data, the method comprising: decoding a first picture of the video data; after decoding the first picture, using reference pixels in the first picture to pad pixels outside a picture boundary of a second picture of the video data, the second picture being a different picture from the first picture, the padded pixels being in a padding area surrounding the second picture; and decoding one or more blocks of the video data based on the padded pixels.

In another example, this disclosure describes a method of encoding video data, the method comprising: decoding a first picture of the video data; after decoding the first picture, using reference pixels in the first picture to pad pixels outside a picture boundary of a second picture of the video data, the second picture being a different picture from the first picture, the padded pixels being in a padding area surrounding the second picture; and encoding one or more blocks of the video data based on the padded pixels.

In another example, this disclosure describes an apparatus for encoding or decoding video data, the apparatus comprising: one or more storage media configured to store the video data; and one or more processing circuits configured to: decode a first picture of the video data; after decoding the first picture, use reference pixels in the first picture to pad pixels outside a picture boundary of a second picture of the video data, the second picture being a different picture from the first picture, the padded pixels being in a padding area surrounding the second picture; and encode or decode one or more blocks of the video data based on the padded pixels.

In another example, this disclosure describes a computer-readable storage medium having instructions stored thereon that, when executed, cause one or more processing circuits to: decode a first picture of video data; after decoding the first picture, use reference pixels in the first picture to pad pixels outside a picture boundary of a second picture of the video data, the second picture being a different picture from the first picture, the padded pixels being in a padding area surrounding the second picture; and encode or decode one or more blocks of the video data based on the padded pixels.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 7A illustrates a horizontal gradient pattern.

FIG. 7B illustrates a vertical gradient pattern.

FIG. 7C illustrates a first diagonal gradient pattern.

FIG. 7D illustrates a second diagonal gradient pattern.

DETAILED DESCRIPTION

Figure 1:
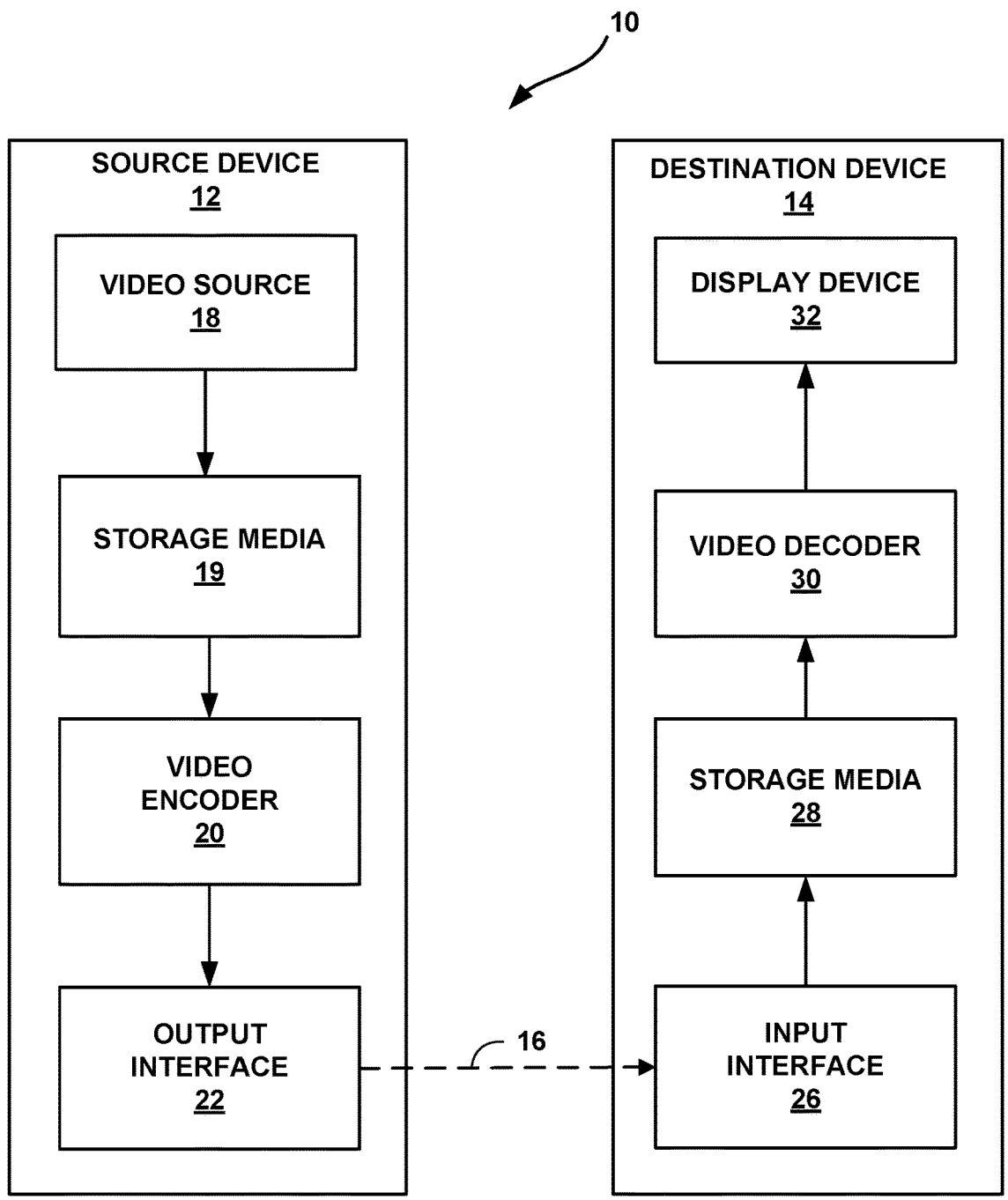
FIG. 1 is a block diagram illustrating an example video encoding and decoding system that may use one or more techniques described in this disclosure.

In video coding, a current block in a current picture may have a motion vector that indicates a location in a reference picture that is outside a picture boundary of the reference picture. Such a situation may arise in various circumstances, such as when merge mode is used to determine the motion vector of the current block and the current block inherits a motion vector from a neighboring block of the current picture. In this case, the motion vector of the neighboring block may indicate a location that is within the picture boundary of the reference picture. However, when the neighboring block's motion vector is taken to start from the current block, the resulting motion vector may indicate a location outside the picture boundary of the reference picture. Hence, the issue arises of what sample values should be used when generating a predictive block for the current block when the motion vector for the current block indicates a location outside the picture boundary of the reference picture.

One method for addressing this issue is to use the closest sample values that are within the picture boundary of the reference picture. For instance, each sample above a sample immediately within the picture boundary may be assumed to have the value of the sample within the picture boundary. A similar principle may be applied for samples left, right, and below the picture boundary of the reference picture. Samples determined in this way may be referred to as padded samples. In this disclosure, the terms sample and pixel may be used interchangeably.

The disclosure describes techniques that may improve the padding process, which may result in improved video compression. In other words, techniques of this disclosure may result in the use of fewer bits to represent the same video data. The use of fewer bits to represent the same video data may help conserve storage space, converse bandwidth, or provide other benefits. For instance, in one example of the techniques of this disclosure, a video coder (e.g., a video encoder or a video decoder) may decode a first picture of the video data. In the case of a video encoder, the video encoder may decode the first picture as part of a decoding loop that reconstructs encoded pictures for purposes of prediction of later pictures. After decoding the first picture, the video coder may use reference pixels in the first picture to pad pixels outside a picture boundary of a second picture of the video data. In this example, the second picture is a different picture from the first picture. The padded pixels are in a padding area surrounding the second picture. Furthermore, in this example, the video coder may encode or decode one or more blocks of the video data based on the padded pixels. Using samples from the first picture in this way may result in more accurate padded samples, which may result in improved video compression and/or image quality. For instance, in examples where the video coder uses the padded pixels for determining samples of a predictive block, the use of more accurate padded samples may reduce the amount of data needed to represent residual data generated from the predictive block, which ultimately may lead to increased video compression. In instances where the padded pixels are used in sample adaptive offset (SAO) filtering or adaptive loop filtering (ALF), the use of more accurate padded samples may increase image quality.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may comprise a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may comprise various types of components or devices. For example, output interface 22 may comprise a wireless transmitter, a modem, a wired networking component (e.g., an Ethernet card), or another physical component. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the High Efficiency Video Coding (HEVC) standard, which is known as ITU-T H.265, its range and screen content coding extensions, its 3D video coding extension (3D-HEVC), its multiview extension (MV-HEVC), and/or its scalable extension (SHVC).

High Efficiency Video Coding (HEVC) or ITU-T H.265, mentioned above, including its range extension, multiview extension (MV-HEVC) and scalable extension (SHVC), was developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). HEVC is published as Recommendation ITU-T H.265, Series H: Audiovisual and Multimedia Systems, Infrastructure of audiovisual services—Coding of moving video, High efficiency video coding, December 2016.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. J. Chen, E. Alshina, G. J. Sullivan, J.-R. Ohm, J. Boyce, "Algorithm Description of Joint Exploration Test Model 6", JVET-F1001, April 2017, is an algorithm description of Joint Exploration Test Model 6 (JEM6) (hereinafter, "JVET-F1001"). The JVET is currently depending the Versatile Video Coding (VVC) standard based on the Joint Exploration Test Model.

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in a bitstream at the time of encoding, which then may be retrieved by a decoding device at any time after being stored to this medium.

In HEVC and other video coding specifications, video data includes a series of pictures. Pictures may also be referred to as "frames." A picture may include one or more sample arrays. Each respective sample array of a picture may comprise an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. A residual block comprises residual samples. Each residual sample may indicate a difference between a sample of one of the generated predictive blocks and a corresponding sample of the block to be coded. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as one or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. In some examples, a coding block is an N×N block of samples. In other examples, a coding block is a M×N block of samples, where M is not equal to N. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. In some video coding standards, there a CU is not divided into multiple PUs. Hence, in such video coding standards, there is no distinction between a PU and a CU. Therefore, when techniques of this disclosure are applied in such standards, discussion of PUs may be applicable to CUs.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction_unit" syntax structure within a "coding_unit" syntax structure for inter predicted PUs, but does not generate a "prediction_unit" syntax structure within a "coding_unit" syntax structure for intra predicted PUs. Rather, in HEVC, syntax elements related to intra predicted PUs are included directly in the "coding_unit" syntax structure.

A video coder, such as video encoder 20 or video decoder 30, may perform intra prediction using an intra prediction mode selected from a plurality of available intra prediction modes. The intra prediction modes may include directional intra prediction modes, which may also be referred to as intra prediction directions. Different directional intra prediction modes correspond to different angles. In some examples, to determine a value of a current sample of a predictive block using a directional intra prediction mode, the video coder may determine a point where a line passing through the current sample at the angle corresponding to the directional intra prediction mode intersects a set of border samples. The border samples may comprise samples in a column immediately left of the predictive block and samples in a row immediately above the predictive block. If the point is between two of the border samples, the video coder may interpolate or otherwise determine a value corresponding to the point. If the point corresponds to a single one of the border samples, the video coder may determine that the value of the point is equal to the border sample. The video coder may set the value of the current sample of the predictive block equal to the determined value of the point.

Video encoder 20 may generate one or more residual blocks for the CU. For instance, video encoder 20 may generate a luma residual block for the CU. Each sample in the CU's luma residual block may indicate a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. In other examples, video encoder 20 may decompose the residual blocks of a CU into transform blocks in other ways. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. Quantization may reduce the bit depth associated with some or all the transform coefficients. For example, an n-bit transform coefficient may be rounded down to an m-bit transform coefficient during quantization, where n is greater than m. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may comprise a sequence of bits that forms a representation of encoded pictures of the video data and associated data. In some examples, a representation of an encoded picture may include encoded representations of blocks of the picture.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Inverse quantization maps a quantized value to a reconstructed value. For instance, video decoder 30 may inverse quantize a value by determining the value multiplied by a quantization step size. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of blocks of the picture. For example, in HEVC and other video coding specifications, a slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of CTUs ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

As mentioned above, a video coder (e.g., video encoder 20 or video decoder 30) may apply inter prediction to generate a predictive block for a video block of a current picture. For instance, in the context of HEVC and other video coding specifications, the video coder may apply inter prediction to generate a predictive block for a prediction block of a PU of a CU of the current block. If the video coder applies inter prediction to generate a predictive block, the video coder may generate the predictive block based on decoded samples of one or more reference pictures. The reference pictures are pictures other than the current picture. The video coder may determine one or more reference picture lists. Each of the reference picture lists may include zero or more reference pictures. In the context of HEVC and other video coding specifications, one of the reference picture lists may be referred to as Reference Picture List 0 (RefPicList0) and another reference picture list may be referred to as Reference Picture List 1 (RefPicList1).

The video coder may apply uni-directional inter prediction or bi-directional inter prediction to generate a predictive block. When the video coder applies uni-directional inter prediction to generate a predictive block for a video block, the video coder determines a single reference block for the video block based on a samples of a single reference picture. Furthermore, when the video coder applies uni-directional inter prediction, the video coder may set the predictive block equal to the reference block. When the video coder applies bi-directional inter prediction to generate a predictive block for a video block, the video coder determines two reference blocks for the video block. In some examples, the two reference blocks are in reference pictures in different reference picture lists. Additionally, when the video coder applies bi-direction inter-prediction, the video coder may determine the predictive block based on the two reference blocks. For instance, the video coder may determine the predictive block such that each sample of the predictive block is a weighted average of corresponding samples of the two reference blocks. Reference list indicators may be used to indicate which of the reference picture lists include reference pictures used for determining reference blocks.

As mentioned above, a video coder may determine a reference block based on samples of a reference picture. In some examples, the video coder may determine the reference block such that each sample of the reference block is equal to a sample of the reference picture. In some examples, as part of determining a reference block, the video coder may interpolate samples of the reference block from samples of the reference picture. For example, the video coder may determine that a sample of the predictive block is a weighted average of two or more samples of the reference picture.

In some examples, when video encoder 20 performs uni-directional inter prediction, video encoder 20 searches for a reference block within one or more reference pictures in one of the reference picture lists. The reference block may be a block of samples that is similar to the prediction block. In some examples, video encoder 20 uses a mean squared error to determine the similarity between the reference block and the prediction block Furthermore, video encoder 20 may determine motion information for the prediction block. The motion information (i.e., the motion parameters) for the prediction block may include a motion vector and a reference index. The motion vector may indicate a spatial displacement between a position of the particular video block within the current picture (i.e., the picture that includes the particular video block) and a position of the reference block within the reference picture. The reference index indicates a position within the reference picture list of the reference frame that contains the reference picture list. The predictive block for the particular video block may be equal to the reference block.

When video encoder 20 performs bi-directional inter prediction for a particular video block, video encoder 20 may search for a first reference block within reference pictures in a first reference picture list ("list 0") and may search for a second reference block within reference pictures in a second reference picture list ("list 1"). Video encoder 20 may generate, based at least in part on the first and the second reference blocks, the predictive block for the particular video block. In addition, video encoder 20 may generate a first motion vector that indicates a spatial displacement between the particular video block and the first reference block. Video encoder 20 may also generate a first reference index that identifies a location within the first reference picture list of the reference picture that contains the first reference block. Furthermore, video encoder 20 may generate a second motion vector that indicates a spatial displacement between the particular video block and the second reference block. Video encoder 20 may also generate a second reference index that identifies a location within the second reference picture list of the reference picture that includes the second reference block.

When video encoder 20 performs uni-directional inter prediction on a particular video block, video decoder 30 may use the motion information of the particular video block to identify the reference block of the particular video block. Video decoder 30 may then generate the predictive block of the particular video block based on the reference block. When video encoder 20 performs bi-directional inter prediction to determine a predictive block for a particular video block, video decoder 30 may use the motion information of the particular video block to determine two reference blocks. Video decoder 30 may generate the predictive block of the particular video block based on the two reference samples of the particular video block.

Video encoder 20 may signal motion information of a video unit (e.g., a PU or other block of video data) in various ways. Such motion information may include motion vectors, reference indexes, reference picture list indicators, and/or other data related to motion. In some examples, video encoder 20 and video decoder 30 may use motion prediction to reduce the amount of data used for signaling motion information. Motion prediction may comprise the determination of motion information of a video unit (e.g., a PU) based on motion information of one or more other video units. There are various types of motion prediction. For instance, merge mode and advanced motion vector prediction (AMVP) mode are two types of motion prediction.

In merge mode, video encoder 20 generates a candidate list. The candidate list includes a set of candidates that indicate the motion information of one or more source video units. The source video units may spatially or temporally neighbor a current video unit. Furthermore, in merge mode, video encoder 20 may select a candidate from the candidate list and may use the motion information indicated by the selected candidate as the motion information of the current video unit. Video encoder 20 may signal an index (i.e., a merge index) indicating the position in the candidate list of the selected candidate. Video decoder 30 may determine, based on information obtained from a bitstream, the index into the candidate list. In addition, video decoder 30 may generate the same candidate list and may determine, based on the index, the selected candidate. Video decoder 30 may then use the motion information of the selected candidate to generate a predictive block for the current video unit.

Skip mode is similar to merge mode. In skip mode, video encoder 20 and video decoder 30 generate and use a candidate list in the same way that video encoder 20 and video decoder 30 use the candidate list in merge mode. However, when video encoder 20 signals the motion information of a current video unit using skip mode, video encoder 20 does not signal any residual data for the current video unit. Accordingly, video decoder 30 may determine, without use of residual data, a predictive block for the video unit based on one or more reference blocks indicated by the motion information of a selected candidate in the candidate list.

AMVP mode is similar to merge mode in that video encoder 20 may generate a candidate list and may select a candidate from the candidate list. However, for each respective reference block used in determining a predictive block for a current video unit, video encoder 20 may signal a respective motion vector difference (MVD) for the current video unit, a respective reference index for the current video unit, and a respective candidate index indicating a selected candidate in the candidate list. An MVD for a video unit may indicate a difference between a motion vector of the video unit and a motion vector of the selected candidate. The reference index for the current video unit indicates a reference picture from which a reference block is determined.

Furthermore, when AMVP mode is used, for each respective reference block used in determining a predictive block for the current video unit, video decoder 30 may determine a MVD for the current video unit, a reference index for the current video unit, and a candidate index and a motion vector prediction (MVP) flag. Video decoder 30 may generate the same candidate list and may determine, based on the candidate index, a selected candidate in the candidate list. As before, this list may include motion vectors of neighboring blocks that are associated with the same reference index as well as a temporal motion vector predictor which is derived based on the motion parameters of the neighboring block of the co-located block in a temporal reference picture. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When a video coder (e.g., video encoder 20 or video decoder 30) generates an AMVP candidate list for a current PU, the video coder may derive one or more AMVP candidates based on the motion information of PUs (i.e., spatially-neighboring PUs) that cover locations that spatially neighbor the current PU and one or more AMVP candidates based on motion information of PUs that temporally neighbor the current PU. In this disclosure, a PU (or other type of video unit) may be said to "cover" a location if a prediction block of the PU (or other type of sample block of the video unit) includes the location. The candidate list may include motion vectors of neighboring blocks that are associated with the same reference index as well as a temporal motion vector predictor which is derived based on the motion parameters (i.e., motion information) of the neighboring block of the co-located block in a temporal reference picture. A candidate in a merge candidate list or an AMVP candidate list that is based on the motion information of a PU that temporally neighbors a current PU (i.e., a PU that is in a different time instance than the current PU) may be referred to as a TMVP. A TMVP may be used to improve the coding efficiency of HEVC and, different from other coding tools, a TMVP may need to access a motion vector of a frame in a decoded picture buffer, more specifically in a reference picture list.

Figure 2:
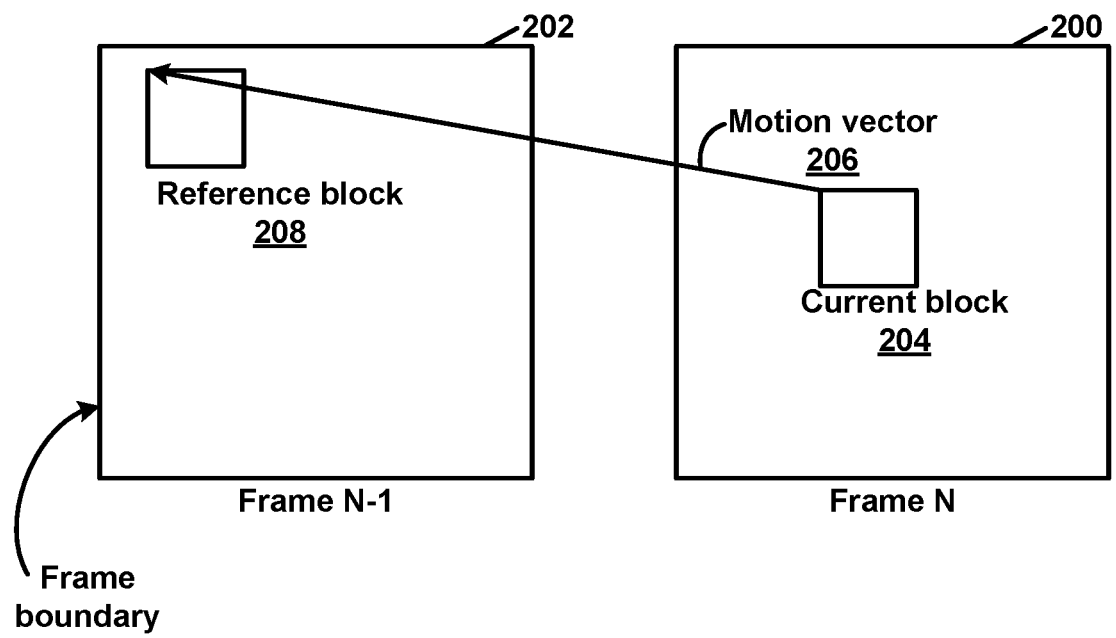
FIG. 2 illustrates an example of motion compensation.

In the video coding standards, pixels in a frame may be predicted by a previously-coded frame. For instance, FIG. 2 illustrates an example of motion compensation in which pixels in a current frame 200 (i.e., Frame N) are predicted from a previously-coded frame 202 (i.e., Frame N−1). As shown in FIG. 2, a current block 204 in current frame 200 is inter-coded and has a motion vector 206. Motion vector 206 points to a reference block 208 in previously-coded frame 202. Then, the pixels in block 204 are predicted from the pixels in reference block 208. It is noted that reference block 208 may be generated by reconstructed samples in one or multiple reference frames.

Figure 3:
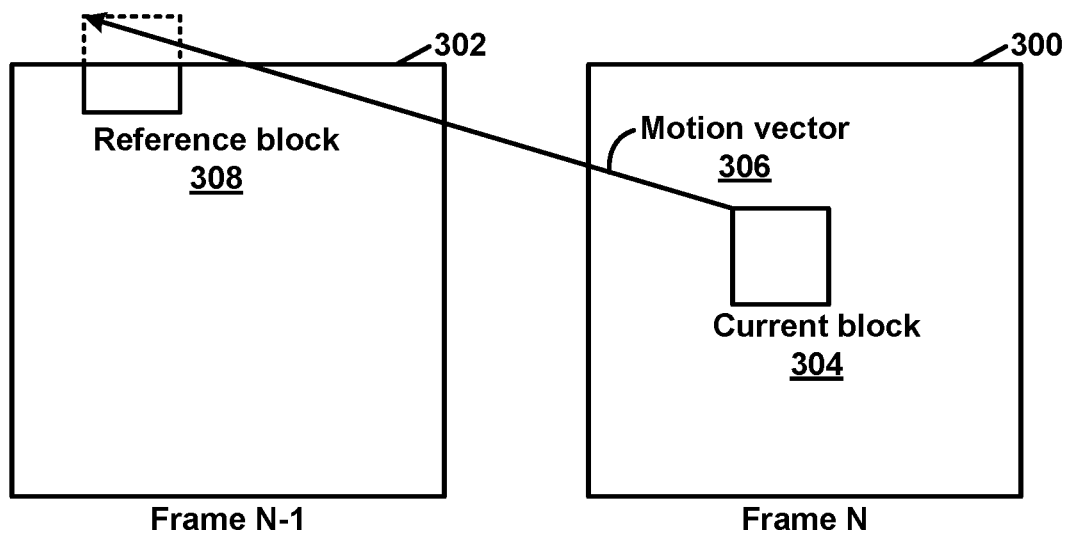
FIG. 3 illustrates an example of motion compensation with a motion vector pointing to a block outside a frame boundary.

However, if the motion vector points to a block outside the frame boundary, at least a part of the reference block is not available, as shown in the example of FIG. 3. In other words, FIG. 3 illustrates an example of motion compensation with a motion vector pointing to a block outside a frame boundary. Particularly, in the example of FIG. 3, a current block 304 in current frame 300 (i.e., Frame N) is inter-coded and has a motion vector 306. Motion vector 306 points to a reference block 308 at least partially outside a frame boundary of previously-coded frame 302 (i.e., Frame N−1).

Figure 4A:
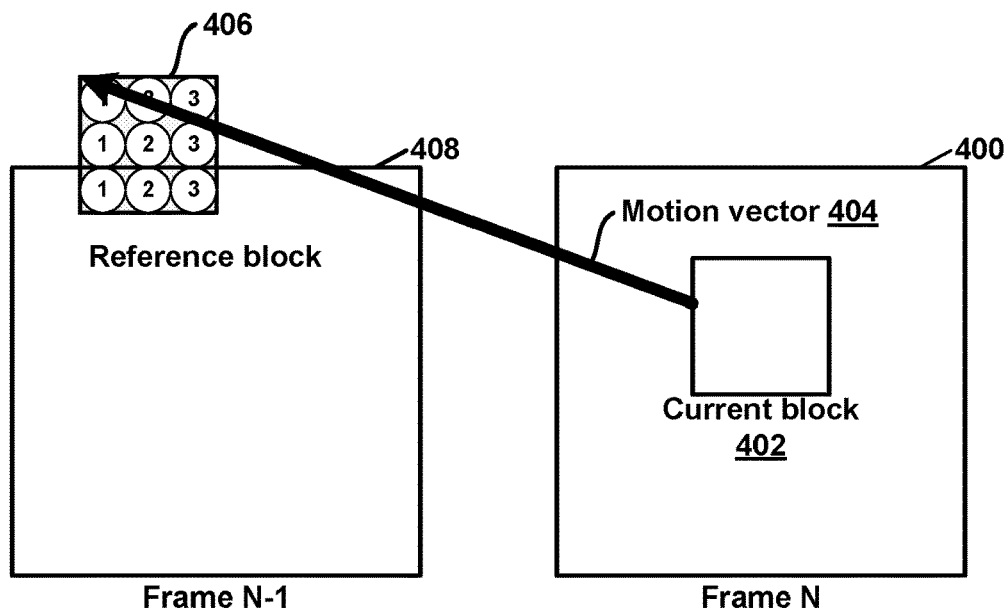
FIG. 4A illustrates an example of replicate frame padding where pixel values outside the frame boundary are inferred as the nearest pixel values inside the frame boundary.
Figure 4B:
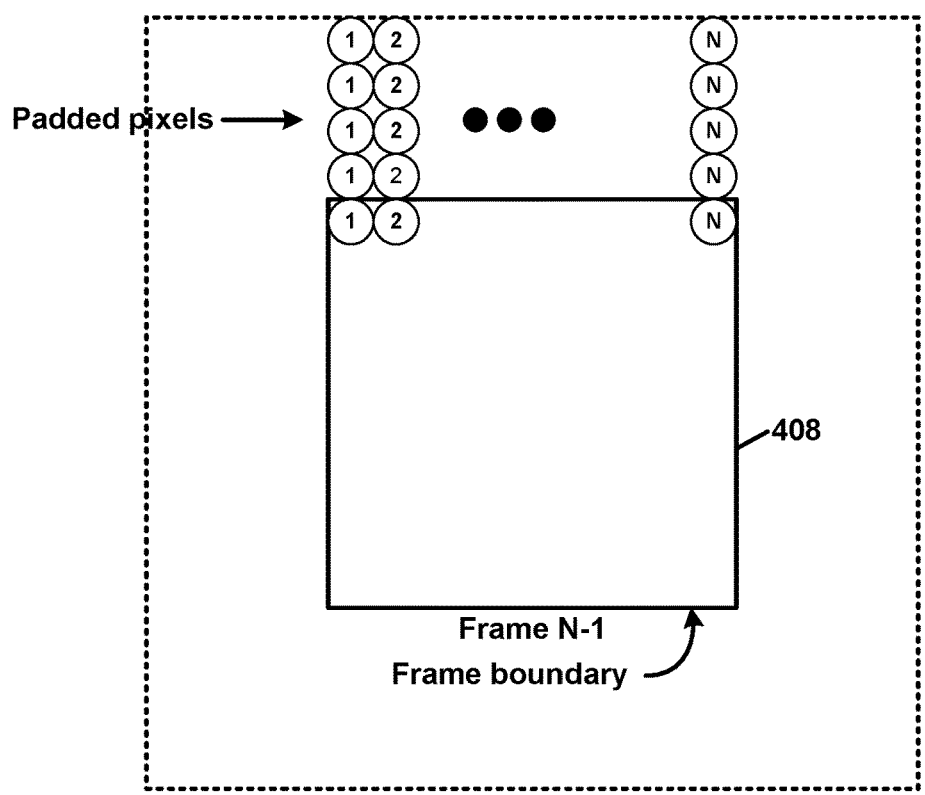
FIG. 4B illustrates an example of replicate frame padding where a video coder repeats boundary pixel values to extend the frame boundary.

In the case where the motion vector points to a block outside the frame boundary, techniques are required to generate those unavailable pixels so that a complete reference block can be obtained to predict the current block. In previous video coding standards, pixel values outside the frame boundary are inferred as the nearest pixel values inside the boundary as shown in FIG. 4A. FIG. 4A illustrates an example of replicate frame padding where pixel values outside the frame boundary are inferred as the nearest pixel values inside the frame boundary. FIG. 4B illustrates an example of replicate frame padding where a video coder repeats boundary pixel values to extend the frame boundary.

Particularly, in the example of FIG. 4A, a current frame 400 (i.e., frame N) includes a current block 402. Current block 402 has a motion vector 404 that indicates a location of a reference block 406 partially outside a boundary (i.e., a frame boundary) of a reference frame 408. In FIG. 4A, each circle in reference block 406 represents a pixel with pixel value N, where N in this context is not related to N as used in the picture numbers of FIG. 4A and FIG. 4B. The pixel values outside the frame boundary of reference frame 408 are inferred as the nearest pixel values inside the boundary. For example, in FIG. 4A and FIG. 4B, the outside pixel values on the first column are inferred as the nearest pixel value inside the boundary, 1; the outside pixel values on the second column are inferred as the nearest pixel value inside the boundary, 2; and the outside pixel values on the third column are inferred as the nearest pixel value inside the boundary, 3. In other words, the decoder repeats the boundary pixel values to extend the frame boundary as shown in FIG. 4B. This technique is called replicate frame padding. After padding, the decoder can access reference frame 408, which now has larger size than the size of the original version of reference frame 408.

In FIG. 4A and FIG. 4B, to pad an image, replicate frame padding only uses spatial pixels but does not use temporal information. Techniques of this disclosure may improve padding. Particular techniques may be referred to herein as motion compensated boundary pixel padding (MCP). This disclosure proposes to use reference pixels in previously decoded frames to pad pixels outside a padding boundary, such as a picture boundary (i.e., a frame boundary). Thus, in some examples of this disclosure, after decoding a first picture, a video coder (i.e., video encoder 20 or video decoder 30) may use reference pixels in the first picture to pad pixels outside a picture boundary of a second picture of the video data. In such examples, the padded pixels are in a padding area surrounding the second picture. The video coder may encode or decode one or more blocks of video data based on the padded pixels.

Figure 5:
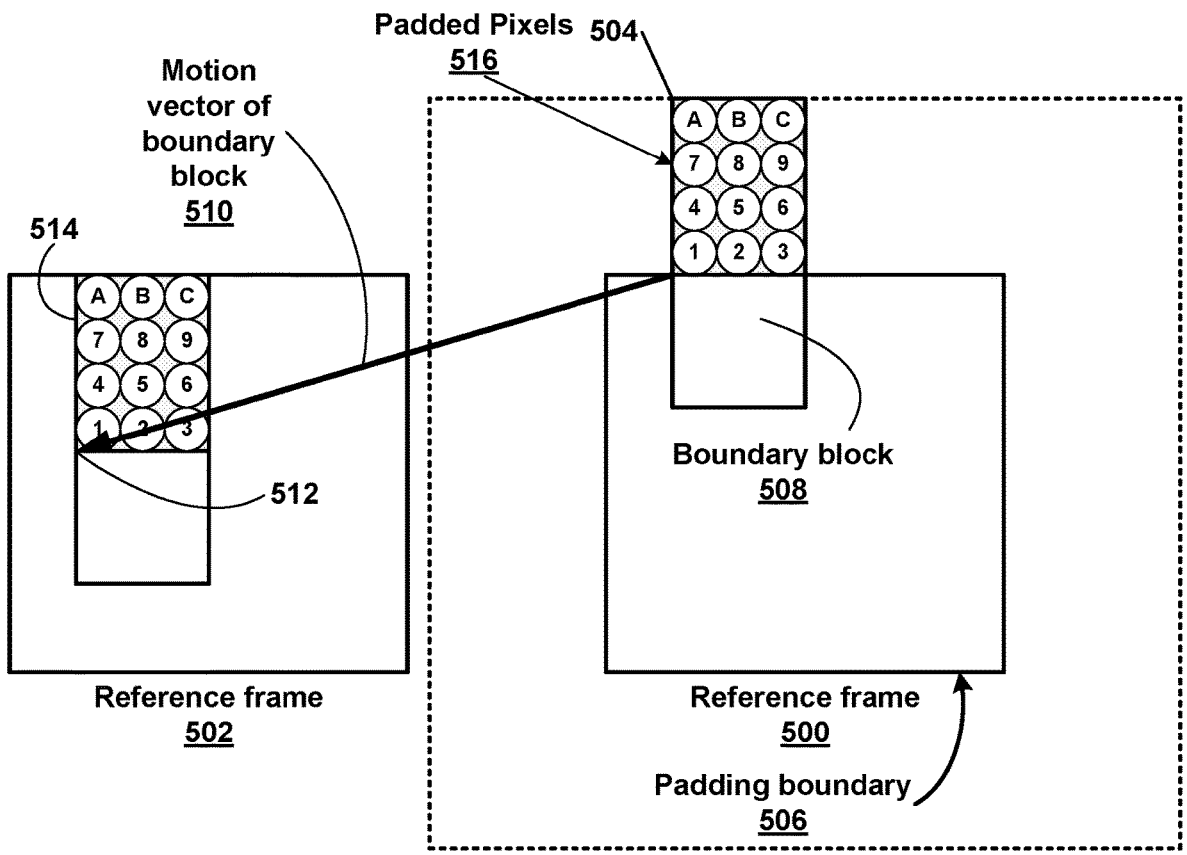
FIG. 5 illustrates an example of motion compensated boundary pixel padding (MCP) in accordance with one or more techniques of this disclosure.

In some examples, the position of the reference pixels may be derived by a decoded motion vector of a block along the boundary. FIG. 5 illustrates an example of motion compensated boundary pixel padding (MCP) in accordance with one or more techniques of this disclosure. In MCP, a video coder (e.g., video encoder 20 or video decoder 30) uses the motion of a boundary block to get corresponding pixels, pixel 1-9 and A-C, and uses those pixels to derive pixel values outside a padding boundary. The padding boundary can be a frame boundary, slice boundary, tile boundary, or another type of boundary across which a video coder is unable to use actual values of samples for coding samples within the boundary. A frame boundary (i.e., a picture boundary) is a line that marks an outer limit of a picture as a whole. A slice boundary is a line that marks an outer limit of a slice. A tile boundary is a line that marks an outer limit of a tile. Actual values of samples outside a padding boundary may be considered to be unavailable for use in coding samples inside the padding boundary.

For instance, in the example of FIG. 5, an inter-coded current block of a current frame (not shown in FIG. 5) may have a motion vector that points to a location outside a padding boundary of a reference frame 500. Reference frame 500 is a first reference picture for the current frame (not shown in FIG. 5) and a reference frame 502 is a second reference picture for the current frame. In the instance that the current frame is at position N in a coding order, reference frame 500 may be at position N−1 in the coding order. Hence, reference frame 500 may be denoted as frame N−1. Similarly, reference frame 502 may be at position N−2 in the coding order. Hence, reference frame 500 may be denoted as frame N−2.

Furthermore, in the example of FIG. 5, the current block of the current picture may have a width of 3 samples and a height of 4 samples. The motion vector of the current block of the current picture may specify a position 504 outside a padding boundary 506 of reference frame 500. Hence, in accordance with a technique of this disclosure, the video coder may identify a boundary block 508 located within padding boundary 506 of reference frame 500. Assuming boundary block 508 has a motion vector 510, the video coder may use motion vector 510 to identify a position 512 in reference frame 502. The video coder may then determine a sample block 514 in reference frame 502 having the same dimensions as the current block. A top-left corner of sample block 514 may have the same position relative to position 512 as position 504 has relative to a top-left corner of boundary block 508. For example, let $(x_1, y_1)$ denote a position of the top-left corner of boundary block 508, let $(x_1, y_1-a)$ denote position 504, and let $(x_2, y_2)$ denote position 512. Accordingly, in this example, the top-left corner of sample block 514 may be at $(x_2, y_2-a)$. In the example of FIG. 5, the video coder may determine values of padded pixels 516 based on values of samples in sample block 514.

For instance, the video coder may use the values of samples in sample block 514 as the values of samples in padded pixels 516.

The video coder may use padded pixels 516 to perform various other actions in an encoding or decoding process. In other words, the video coder may encode or decode one or more blocks of video data based on padded pixels 516. For instance, the video coder may determine sample values in a predictive block of the current block based on padded pixels 516. For instance, if the current block is uni-directionally inter predicted, the video coder may determine that one or more samples in the predictive block of the current block are equal to padded pixels 516. If the current block is bi-directionally inter predicted, the video coder may determine values of samples in the predictive block of the current block based on padded pixels 516 and samples determined using another motion vector of the current block.

Figure 6:
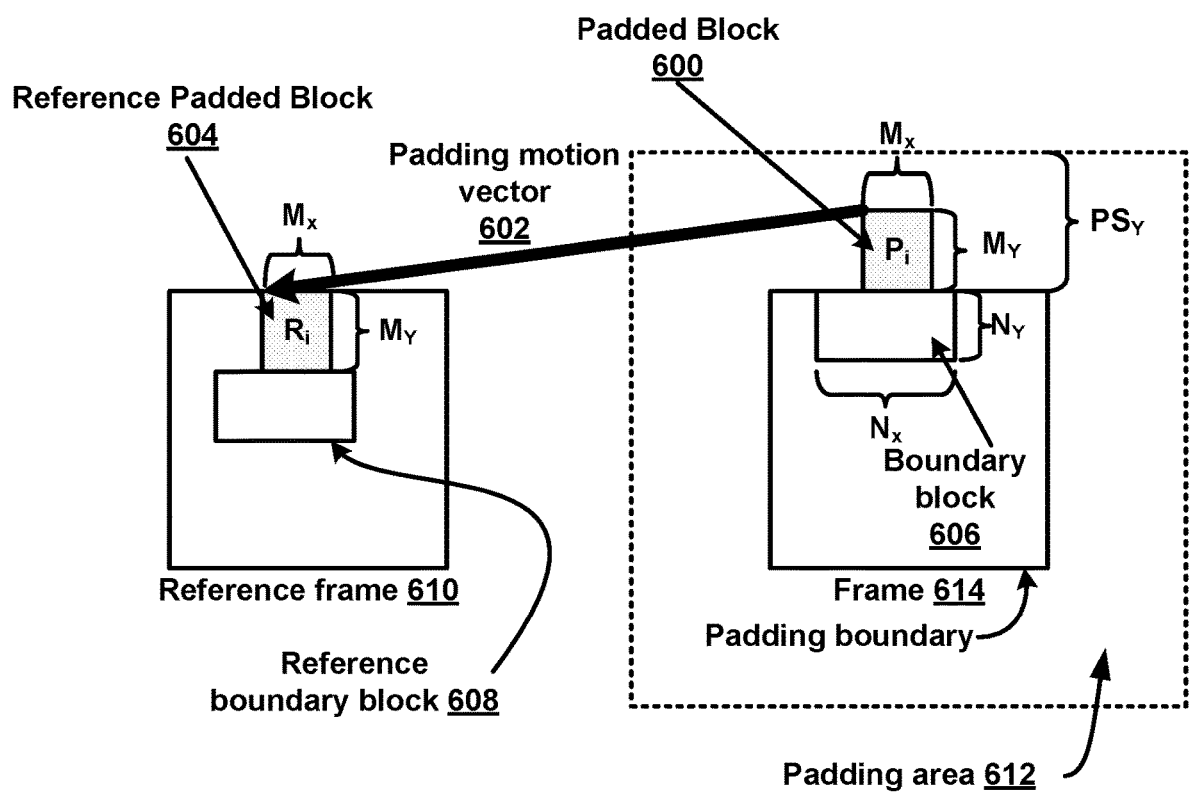
FIG. 6 illustrates motion compensated boundary pixel padding (MCP) in accordance with one or more techniques of this disclosure.

FIG. 6 illustrates details of MCP in accordance with one or more techniques of this disclosure. In the example of FIG. 6, $P_i$ is a padded pixel in a padded block 600, denoted $PBlk_j$, while the block width of padded block 600 is $M_X$ and height of padded block 600 is $M_Y$. A video coder (e.g., video encoder 20 or video decoder 30) derives a padding motion vector 602, denoted $PMV_j$, which points to a reference padded block 604, denoted $RPBlk_j$. $RPBlk_j$ contains a reference padded pixel, $R_i$. To derive $PMV_j$, the video coder can use motion vectors in a boundary block 606, denoted $BBlk_j$. A block width of boundary block 606 is denoted Nx and a block height of boundary block 606 is denoted $N_Y$. After obtaining $R_i$, the video coder uses $R_i$ to derive a padded value for $P_i$. That is, for each value i from 0 to j−1, where j is the number of samples in padded block 600, the video coder may use $R_i$ to derive a padded value for $P_i$. In some examples, boundary block 606 (i.e., BBlKj) is a coded block.

In some examples, BBlKj is a sub-block of a coded block. For example, a block may be partitioned into sub-blocks. For instance, in HEVC, a PU may be partitioned into sub-PUs. In this example, a single merge index may be encoded at the level of the block. The merge index may indicate the use of the sub-PUs in determining the motion information for the block. In this example, each of the sub-blocks may have a different motion vector that is automatically determined (e.g., from blocks in a reference block that are co-located with the sub-blocks). Thus, in this example, boundary block 606 may be one of the sub-blocks. A PU may also be partitioned into sub-PUs in affine motion compensation, for use with advanced motion vector prediction (AMVP) and other coding modes.

The video coder may determine the size of padded block 600 in various ways. One example of size setting is that $M_X$ is 4, $M_Y$ is 32, $N_X$ is 4, $N_Y$ is 4. Alternatively, the video coder may derive $M_Y$ from $PMV_j$. One example is that $M_Y$ is a vertical distance that contains a maximum count of all corresponding pixels, $R_i$, are inside the boundary of Frame M. To simplify implementation complexity, there can be a maximum value, $MAX\_M_Y$. When $M_Y$ is larger than $MAX\_M_Y$, $M_Y$ can be set as $MAX\_M_Y$. $MAX\_M_Y$ can be 16, 32, 64, 128, or signaled. $MAX\_M_Y$ can be one or multiple of CTU size. Another constraint can be that $N_X$ equals $M_X$ or $N_X$ equals the minimum block size of the motion vector buffer.

If the padding area size, $PS_Y$, is larger than $M_Y$, some pixels do not have corresponding samples $R_i$ inside the boundary of Frame M. Those pixels can be padded by replicate padding. The source pixel of replicate padding can be the MCP pixels, i.e., $P_i$, or the pixels inside the padding boundary. Alternatively, multiple $RPBlk_j$ may be identified and they are used to pad the current $PBlk_j$.

The video coder uses motion vectors in boundary block 606 (i.e., $BBlk_j$) to derive padding motion vector 602 (i.e., $PMV_j$). If there is only a motion vector associated with boundary block 606, the video coder can use the vector as $PMV_j$. If there is more than one motion vector in boundary block 606, the video coder can use one of the motion vectors, a median of the motion vectors, or a weighted value of the motion vectors as $PMV_j$ after scaling if needed.

If the derived $PMV_j$ is a bi-prediction motion vector (i.e., the derived $PMV_j$ contains two motion vectors pointing to two positions), the video coder may use the vector pointing to the position which is inside the boundary and furthest to the boundary. Alternatively, the video coder may first scale the two motion vectors to the same reference picture, if needed, and the select one of them.

In some examples, if the derived $PMV_j$ points to a sub-pixel position, the video coder may apply sub-pixel motion compensation to determine $R_i$. For example, the padding motion vector may point to a location between two pixels of reference frame 610. In this example, the video coder may interpolate the samples of reference padded block 604 from samples of reference frame 610 to determine R. Alternatively, in some examples, the video coder may round $PMV_j$ to integer precision and do integer-pixel motion compensation. In other words, the video coder may round padding motion vector 602 such that horizontal and vertical components of padding motion vector 602 are integers and may then use the value of the sample in reference frame 610 as the value of $P_i$.

After deriving a padding motion vector, $PMV_j$, the video coder can obtain reference padded pixels, $R_i$, and use $R_i$ to derive a padding value for $P_i$. In other words, the video coder may use a reference pixel $R_i$ in a first picture (e.g., reference frame 610) to pad a pixel $P_i$ outside a padding boundary (e.g., picture boundary, tile boundary, slice boundary, etc.) of a second picture (e.g., frame 614). In one example, $P_i=R_i$. Thus, the video coder may directly use $R_i$ to pad $P_i$. In other words, for each value i from 0 to j−1, where j is the number of samples in padded block 600, the video coder may set $P_i$ equal to $R_i$.

In some examples, the video coder may derive a padding value for $P_i$ as $P_i=R_i+\beta$. In other words, $P_i$ is derived by $R_i$ and an offset, $\beta$. The $\beta$ value can be derived from pixels in boundary block 606 and a reference boundary block 608. For example, $\beta$ may be the difference between the average pixel value of boundary block 606 and an average pixel value of reference boundary block 608. In another example, $\beta$ is the difference between a maximum (or minimum) pixel value of boundary block 606 and a maximum (or minimum) pixel value of reference boundary block 608.

In one example, the video coder may derive a padding value for $P_i$ as $P_i=\alpha*R_i+\beta$. In this example, the $\alpha$ and $\beta$ value can be derived from pixels in boundary block 606 and reference boundary block 608. In the above two examples, the parameters $\alpha$ and/or $\beta$ may change from pixel to pixel. For instance, in some examples, $\alpha$ and/or $\beta$ may depend on the relative coordinators of $P_i$. In this example, $\beta$ may be determined in the same way as any of the examples provided elsewhere in this disclosure. In some examples, video encoder 20 may select $\alpha$ and signal $\alpha$ in the bitstream. In some examples, $\alpha$ may be chosen from {−8, −4, −2, −1, 0, 1, 2, 4, 8}, The motion compensated padded pixels (e.g., padded pixels 516 (FIG. 5); pixels in padded block 600 (FIG. 6)) can be also used for other tools that need to access pixel values outside the picture boundary, such as SAO and ALF. G. J. Sullivan; J.-R. Ohm; W.-J. Han; T. Wiegand (December 2012). "Overview of the High Efficiency Video Coding (HEVC) Standard," IEEE Transactions on Circuits and Systems for Video Technology (IEEE) 22 (12) (Retrieved 2012 Sep. 14) includes a discussion of SAO. J. Chen, E. Alshina, G. J. Sullivan, J.-R. Ohm, J. Boyce, "Algorithm Description of Joint Exploration Test Model 6," JVET-F1001, April 2017 includes a discussion of ALF.

There are two types of SAO filtering, namely SAO band offset filtering and SAO edge offset filtering. When SAO edge offset filtering is performed, video encoder 20 may determine a SAO edge offset class for a block. Video encoder 20 may also determine a look-up table that maps edge index classifications to offset values. Video encoder 20 may use a rate-distortion analysis to determine whether to use SAO edge offset filtering, to determine which SAO edge offset class to use for the block, and to determine the offset values in the look-up table. Video encoder 20 may signal the SAO filtering type (e.g., using a sao_type_idx syntax element), the SAO edge offset class (e.g., using a sao_eo_idx syntax element), and the look-up table in the bitstream.

Figures 7A, 7B, 7C, 7D:
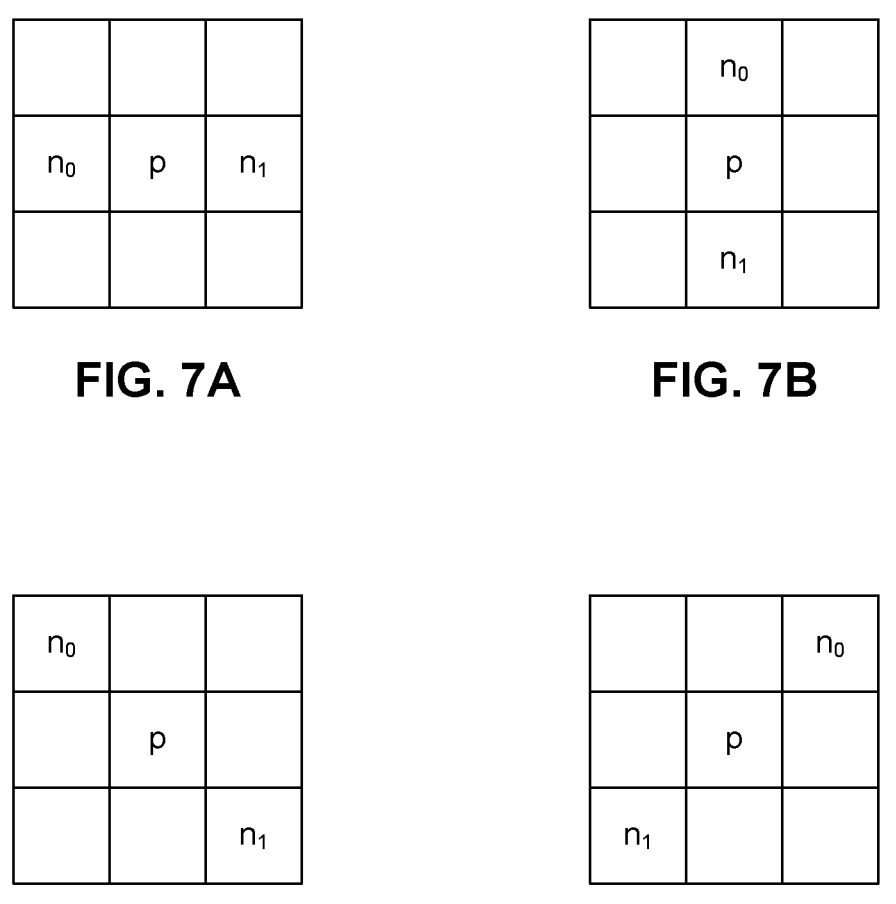

Each SAO edge offset class corresponds to a different gradient direction. FIG. 7A through FIG. 7D illustrate four gradient patterns used for SAO edge offset filtering. In FIGS. 7A-7D, "p" denotes the current sample and $n_0$ and $n_1$ denote neighboring samples. FIG. 7A illustrates a horizontal gradient pattern. In some examples, the horizontal gradient pattern of FIG. 7A corresponds to edge offset class 0 (i.e., sao_eo_class=0). FIG. 7B illustrates a vertical gradient pattern. In some examples, the vertical gradient pattern of FIG. 7B corresponds to edge offset class 1 (i.e., sao_eo_class=1). FIG. 7C illustrates a first diagonal gradient pattern. In some examples, the diagonal gradient pattern of FIG. 7C corresponds to edge offset class 2 (i.e., sao_eo_class=2). FIG. 7D illustrates a second diagonal gradient pattern. In some examples, the diagonal gradient pattern of FIG. 7D corresponds to edge offset class 3 (i.e., sao_eo_class=3).

Both video encoder 20 and video decoder 30 may use the following table to determine an edge index classification for each sample of the block.

| EdgeIdx | Condition | Meaning |
|---|---|---|
| 0 | Cases not listed below | Monotonic area |
| 1 | $p < n_0$ and $p < n_1$ | Local minimum |
| 2 | $p < n_0$ and $p = n_1$ or $p < n_1$ and $p = n_0$ | Edge |
| 3 | $p > n_0$ and $p = n_1$ or $p > n_1$ and $p = n_0$ | Edge |
| 4 | $p > n_0$ and $p > n_1$ | Local max |

For instance, using the gradient pattern associated with the SAO edge offset class associated with the block, if video encoder 20 or video decoder 30 determines that $p<n_0$ and $p<n_1$, the edge index classification for the current sample is determined to be EdgeIdx 0. The other rows of the table above are interpreted in a similar way. Video encoder 20 and video decoder 30 may then use the look-up table to determine an offset value for a sample based on the edge index classification for the sample. Both video encoder 20 and video decoder 30 may then add the offset value to the decoded value of the sample to determine a final value of the sample.

Thus, a video coder (e.g., video encoder 20 or video decoder 30) may determine the edge index classification for a current sample of a block based on the values of samples that neighbor the current sample. In instances where the current sample is adjacent to a padding boundary, one or more of the neighboring samples may be outside the padding boundary. For instance, in the example of FIG. 7A, if the current sample is at the leftmost edge of the current picture, neighboring sample n0 is outside a padding boundary. In prior methods, the video coder would use replicate frame padding such that the value of the neighbor sample outside the boundary is assumed to be equal to the value of the nearest pixel inside the padding boundary. For instance, in the example of FIG. 7A, if neighboring sample n0 is outside the padding boundary, the video coder may use the decoded, non-filtered value of the current sample (p) as the value of neighboring sample n0. This may result in the video coder selecting a suboptimal edge index classification for the current sample, which may result in decreased image quality.

In accordance with a technique of this disclosure, a video coder (e.g., video encoder 20 or video decoder 30) may use the values of one or more samples of a reference picture as the values of neighboring samples that are outside the padding boundary. For example, the video coder may determine a padding motion vector based on a motion vector of a boundary block. In this example, the boundary block may be a block that contains the current sample within the current picture, a block of the current picture that is closest to the neighboring sample, a closest inter coded block of the current picture to the neighboring sample, or another block of the current picture. The padding motion vector may be determined in accordance with any of the examples described elsewhere in this disclosure for determining the padding motion vector. Furthermore, in this example, the video coder may use the padding motion vector to determine a location in a reference picture. The reference picture is a picture occurring prior to the current picture in decoding order. To use the padding motion vector to determine the location in the reference picture, the video coder may effectively shift an origin point of the padding motion vector to a location of the neighboring sample and use the resulting padding motion vector to determine a location in the reference picture. If the location in the reference picture is a full-integer position, the video coder may use the value of the sample at the location in the reference picture as the value of the neighboring sample. If the location in the reference picture is a sub-pixel position, the video coder may interpolate a value for the location in the reference picture based on two or more samples in the reference picture and use the resulting interpolated value as the value of the neighboring sample.

As noted above, the motion compensated padding techniques of this disclosure may be used in adaptive loop filtering (ALF). In some implementations of ALF, a video coder (e.g., video encoder 20 or video decoder 30) may determine a classification index for each 2×2 block of a current picture. The classification index for a block indicates a class to which the block belongs. In some examples, there are 25 different classes. The video coder may determine the classification index for a block based on a directionality of the block and a quantized value of an activity of the block. For instance, the video coder may determine a classification index C for a block as:

$$C = 5D + \hat{A}$$

In the equation above, D is the directionality of the block and $\hat{A}$ is the activity of the block. To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, V_{k,l} = |2R(k, l) - R(k, l-1) - R(k, l+1)|,$$

$$g_h = \sum_{k=i-2}^{i+3} \sum_{l=j-2}^{j+3} H_{k,l}, H_{k,l} = |2R(k, l) - R(k-1, l) - R(k+1, l)|,$$

$$g_{d1} = \sum_{k=i-2}^{i+3} \sum_{j=j-2}^{j+3} D1_{k,l}, D1_{k,l} = |2R(k, l) - R(k-1, l-1) - R(k+1, l+1)|$$

$$g_{d2} = \sum_{k=i-2}^{i+3} \sum_{j=j-2}^{j+3} D2_{k,l}, D2_{k,l} = |2R(k, l) - R(k-1, l+1) - R(k+1, l-1)|$$

Indices i and j refer to the coordinates of the upper left sample in the 2×2 block and R(i, j) indicates a reconstructed sample at coordinate (i, j).

The video coder may then set D maximum and minimum values of the gradients of horizontal and vertical directions are set as:

$$g_{h,v}^{max} = \max(g_h, g_v), g_{h,v}^{min} = \min(g_h, g_v),$$

and the maximum and minimum values of the gradient of two diagonal directions are set as:

$$g_{d0,d1}^{max} = \max(g_{d0}, g_{d1}), g_{d0,d1}^{min} = \min(g_{d0}, g_{d1}),$$

To derive the value of the directionality D, the video coder may compare these values against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The video coder may calculate an activity value A as:

$$A = \sum_{k=i-2}^{i+3} \sum_{l=j-2}^{j+3} (V_{k,l} + H_{k,l}).$$

The video coder may further quantize A to the range of 0 to 4, inclusively, and the quantized value is denoted as Â. For both chroma components in a picture, no classification method is applied, i.e., a single set of ALF coefficients is applied for each chroma component.

Figure 8:
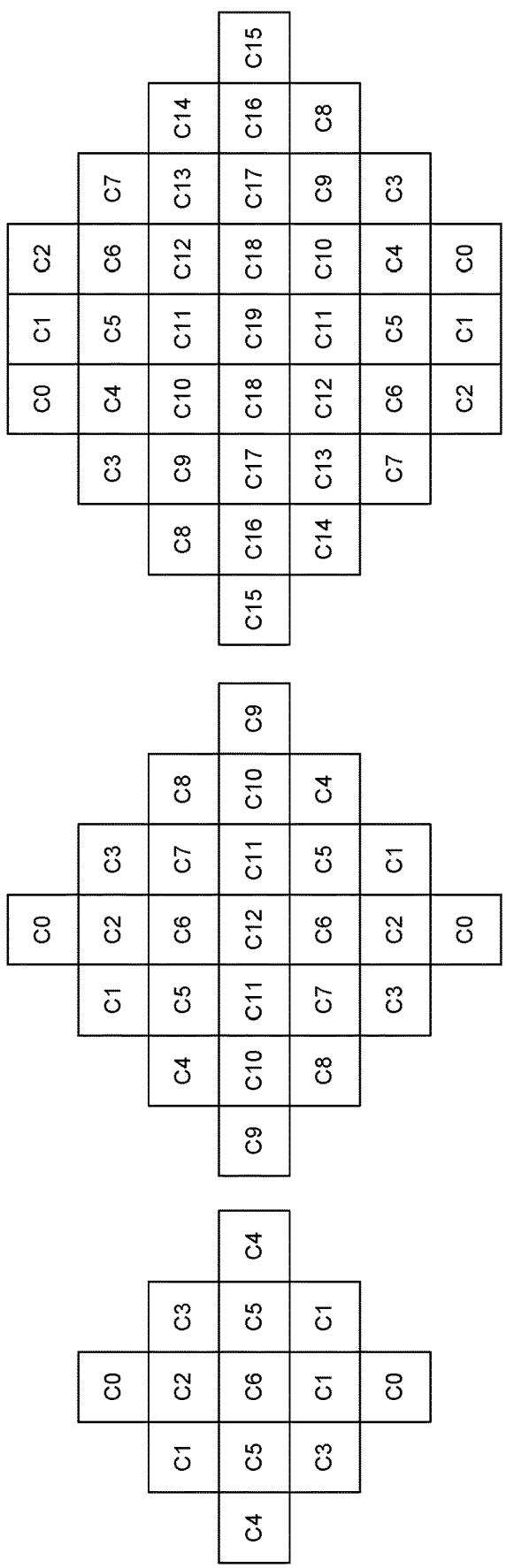
FIG. 8 illustrates three example diamond-shaped filters that may be used in adaptive loop filtering (ALF).

After determining the classification index for a block of the current picture, the video coder may apply a filter to each sample of the block. In some examples, the video coder may use up to three diamond-shaped filters for the luma component. FIG. 8 illustrates three example diamond-shaped filters that may be used in ALF. Different classification indexes correspond to different sets of filter coefficients. For instance, some classification indexes may correspond to different filter coefficients for the small diamond-shaped filter of FIG. 8, other classification indexes may correspond to different filter coefficients for the medium diamond-shaped filter of FIG. 8, and still other classification indexes may correspond to different filter coefficients for the large diamond-shaped filter of FIG. 8. When ALF is enabled for a CU, each sample R(i, j) within the CU is filtered, resulting in sample value R'(i, j) as shown in the equation below, where L denotes filter length, $f_{m,n}$ represents filter coefficient, and f(k,l) denotes the decoded filter coefficients.

$$R'(i, j) = \sum_{k=-L/2}^{L/2} \sum_{l=-L/2}^{L/2} f(k, l) \times R(i+k, j+l)$$

Thus, in ALF, a video coder may use the values of neighboring samples in the current picture both when determining the classification index and when applying the filter. Hence, the neighboring samples may be outside a padding boundary relative to a current block. In prior methods, the video coder would use the value of the nearest pixel inside the padding boundary as the value of the neighbor sample outside the boundary.

In accordance with a technique of this disclosure, when applying ALF, a video coder (e.g., video encoder 20 or video decoder 30) may use the values of one or more samples of a reference picture as the values of neighboring samples that are outside the padding boundary. For example, the video coder may determine a padding motion vector based on a motion vector of a boundary block. In this example, the boundary block may be a block that contains the current sample within the current picture, a block of the current picture that is closest to the neighboring sample, a closest inter coded block of the current picture to the neighboring sample, or another block of the current picture. The padding motion vector may be determined in accordance with any of the examples described elsewhere in this disclosure for determining the padding motion vector. Furthermore, in this example, the video coder may use the padding motion vector to determine a location in a reference picture. The reference picture is a picture occurring prior to the current picture in decoding order. To use the padding motion vector to determine the location in the reference picture, the video coder may effectively shift an origin point of the padding motion vector to a location of the neighboring sample and use the resulting padding motion vector to determine a location in the reference picture. If the location in the reference picture is a full-integer position, the video coder may use the value of the sample at the location in the reference picture as the value of the neighboring sample. If the location in the reference picture is a sub-pixel position, the video coder may interpolate a value for the location in the reference picture based on two or more samples in the reference picture and use the resulting interpolated value as the value of the neighboring sample.

In one example, the techniques of this disclosure are only applied when the current block (or sub-block) is inter-coded. That is, for an intra-coded block, when to pad its neighboring samples, the original design such as in HEVC may be utilized. For example, the video coder may use a set of reference samples in the current picture when determining a predictive block for an intra coded block of the current picture. Typically, the reference samples include samples in a row above the intra coded block and samples in a column left of the intra coded block. Hence, the reference samples may include one or more samples that are outside a padding boundary. In HEVC, a video coder may set reference samples that are outside the padding boundary to a default value or interpolate the reference samples from reference samples that are within the padding boundary. In some examples, the techniques of this disclosure are only applied when the current block (or sub-block) is inter-coded and it is uni-predicted.

In some examples, the video coder applies the process of motion-compensated padding after a picture is fully decoded. For instance, in the example of FIG. 6, a video coder may use techniques of this disclosure to determine the values of all samples in padding area 612 after the video coder has fully decoded frame 614 (frame 614 may be referred to as frame N−1 when frame 614 has a picture order count (POC) value one less than that of a current frame, which is assumed to have a POC value of N). In this way, padded samples in padding area 612 may be available for use in decoding subsequent pictures in decoding order. In one example, a video coder applies the process of motion-compensated padding right after a picture is reconstructed but before the video coder filters the picture (e.g., before the video coder applies a deblocking filter or applies SAO to the filter).

In one example, the process of motion-compensated padding is applied immediately after one block along the boundary is reconstructed. Therefore, the padded samples may be utilized for predicting the preceded blocks. In other words, a current block of a current picture may be adjacent to a padding boundary. In this example, after the video coder has decoded the current block, the video coder may use the motion-compensated padding techniques of this disclosure to determine values of padded samples across the padding boundary from the current block. In this example, the video coder may use the padded samples for determining predictive blocks of subsequent blocks in the current picture.

Figure 9:
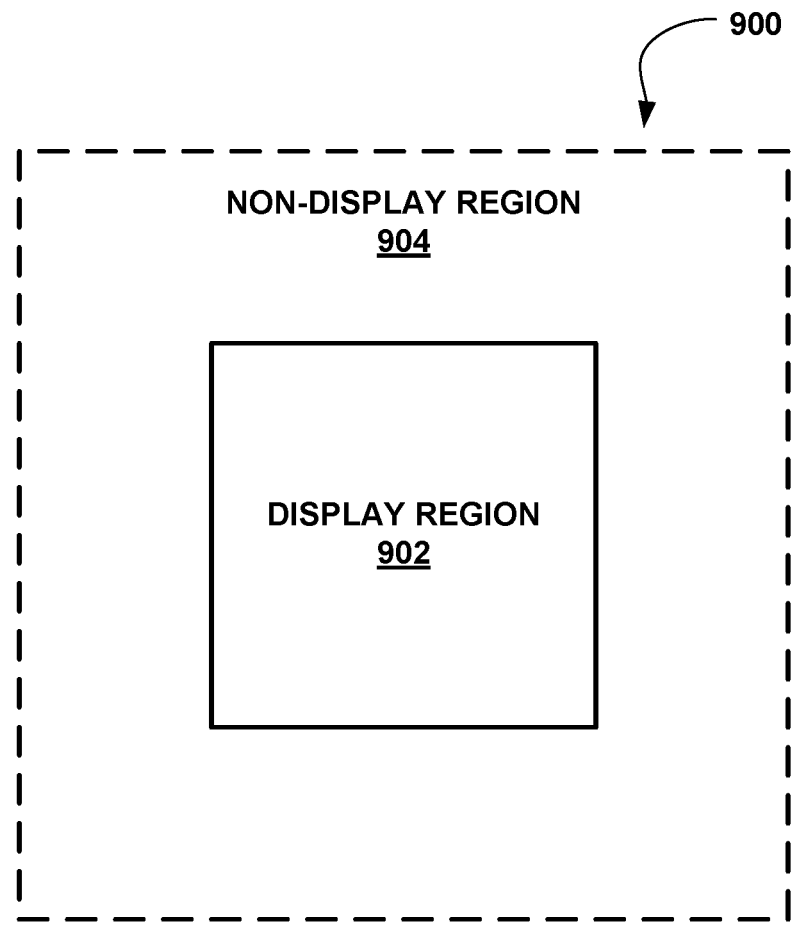
FIG. 9 illustrates encoding a picture with a display region and a non-display region.

To encode a picture, video encoder 20 can encode a picture and mark a certain region as a non-display region that will not be displayed. FIG. 9 illustrates encoding a picture 900 with a display region 902 and a non-display region 904. To reduce bitrate, when video encoder 20 encodes the pixels in non-display region 904, the corresponding coding block can be inferred as SKIP mode that only contains motion information. When a block is encoded with SKIP mode, video encoder 20 does not signal residual data for any block in non-display region 904 but may signal motion information for blocks in non-display region 904. Furthermore, the motion vectors in the later-coded boundary blocks inside display region 902 can be directly inferred by the nearest motion vector in non-display region 904.

For example, let picture 900 be a reference picture for a current picture that occurs after picture 900 in decoding order. In this example, a block of the current picture may have a motion vector that indicates a position in picture 900 that is not in display region 902 of picture 900 but is in non-display region 904 of picture 900. Accordingly, in this example, rather than using a motion vector of a boundary block within display region 902 of picture 900, a video coder (e.g., video encoder 20 or video decoder 30) may use a motion vector of a block in non-display region 904 to determine a location in a second reference picture. In other words, the video coder may determine the padding motion vector from a nearest motion vector of a non-display region of a picture. The video coder may use samples of the second reference picture at the location for various purposes, such as determining a predictive block for the current block, SAO, ALF, etc.

Figure 10:
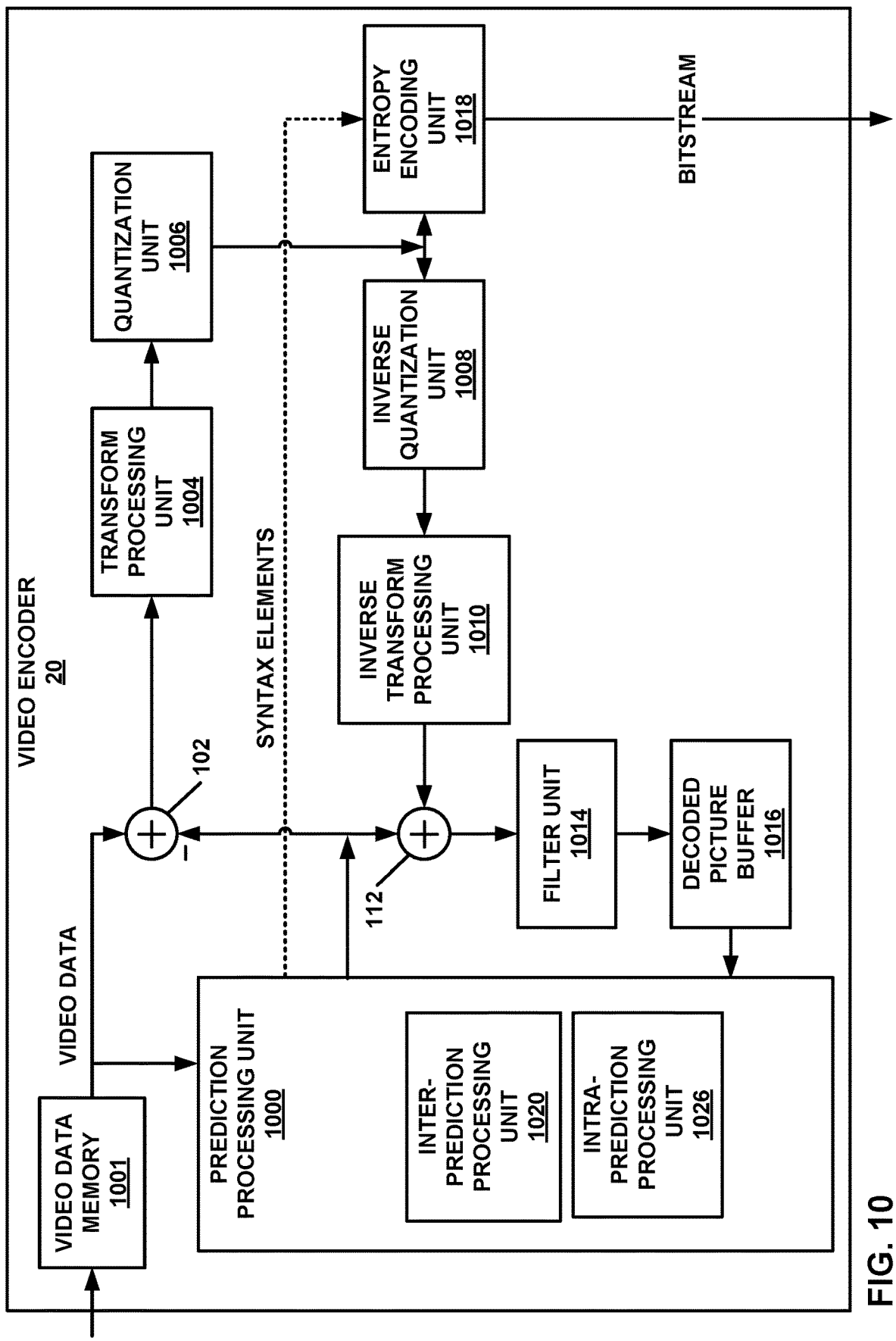
FIG. 10 is a block diagram illustrating an example video encoder that may implement one or more techniques described in this disclosure.

FIG. 10 is a block diagram illustrating an example video encoder 20 that may implement the techniques of this disclosure. FIG. 10 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. Thus, video encoder 20 may comprise one or more processing circuits. For instance, video encoder 20 includes integrated circuitry, and the various units illustrated in FIG. 10 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 10 may be software units executing on the processing circuitry. In such examples, the object code for these software units may be stored in memory. An operating system may cause video encoder 20 to retrieve the object code and execute the object code, which causes video encoder 20 to perform operations to implement the example techniques. In some examples, the software units may include firmware that video encoder 20 executes at startup. Accordingly, video encoder 20 is a structural component having hardware that performs the example techniques or has software/firmware executing on the hardware to specialize the hardware to perform the example techniques.

In the example of FIG. 10, video encoder 20 includes a prediction processing unit 1000, video data memory 1001, a residual generation unit 1002, a transform processing unit 1004, a quantization unit 1006, an inverse quantization unit 1008, an inverse transform processing unit 1010, a reconstruction unit 1012, a filter unit 1014, a decoded picture buffer 1016, and an entropy encoding unit 1018. Prediction processing unit 1000 includes an inter-prediction processing unit 1020 and an intra-prediction processing unit 1026. Inter-prediction processing unit 1020 may include a motion estimation unit and a motion compensation unit (not shown).

Video data memory 1001 may be configured to store video data to be encoded by the components of video encoder 20. The video data stored in video data memory 1001 may be obtained, for example, from video source 18. Decoded picture buffer 1016 may be a reference picture memory that stores reference video data for use in encoding video data by video encoder 20, e.g., in intra- or inter-coding modes. Video data memory 1001 and decoded picture buffer 1016 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 1001 and decoded picture buffer 1016 may be provided by the same memory device or separate memory devices. In various examples, video data memory 1001 may be on-chip with other components of video encoder 20, or off-chip relative to those components. Video data memory 1001 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 1000 may perform partitioning to divide the CTBs of the CTU into progressively-smaller blocks. The smaller blocks may be coding blocks of CUs. For example, prediction processing unit 1000 may partition a CTB associated with a CTU according to a tree structure.

Video encoder 20 may encode CUs of a CTU to generate encoded representations of the CUs (i.e., coded CUs). As part of encoding a CU, prediction processing unit 1000 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 1020 may generate predictive data for a PU. As part of generating the predictive data for a PU, inter-prediction processing unit 1020 performs inter prediction on the PU. The predictive data for the PU may include predictive blocks of the PU and motion information for the PU. Inter-prediction processing unit 1020 may perform different operations for a PU of a CU depending on whether the PU is in an I slice, a P slice, or a B slice. In an I slice, all PUs are intra predicted. Hence, if the PU is in an I slice, inter-prediction processing unit 1020 does not perform inter prediction on the PU. Thus, for blocks encoded in I-mode, the predicted block is formed using spatial prediction from previously-encoded neighboring blocks within the same frame. If a PU is in a P slice, inter-prediction processing unit 1020 may use uni-directional inter prediction to generate a predictive block of the PU. If a PU is in a B slice, inter-prediction processing unit 1020 may use uni-directional or bi-directional inter prediction to generate a predictive block of the PU.

Intra-prediction processing unit 1026 may generate predictive data for a PU by performing intra prediction on the PU. The predictive data for the PU may include predictive blocks of the PU and various syntax elements. Intra-prediction processing unit 1026 may perform intra prediction on PUs in I slices, P slices, and B slices.

To perform intra prediction on a PU, intra-prediction processing unit 1026 may use multiple intra prediction modes to generate multiple sets of predictive data for the PU. Intra-prediction processing unit 1026 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 1026 may use various numbers of intra prediction modes, e.g., 33 directional intra prediction modes. In some examples, the number of intra prediction modes may depend on the size of the region associated with the PU.

Prediction processing unit 1000 may select the predictive data for PUs of a CU from among the predictive data generated by inter-prediction processing unit 1020 for the PUs or the predictive data generated by intra-prediction processing unit 1026 for the PUs. In some examples, prediction processing unit 1000 selects the predictive data for the PUs of the CU based on rate/distortion metrics of the sets of predictive data. The predictive blocks of the selected predictive data may be referred to herein as the selected predictive blocks.

Residual generation unit 1002 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 1002 may generate the residual blocks of the CU such that each sample in the residual blocks has a value equal to a difference between a sample in a coding block of the CU and a corresponding sample in a corresponding selected predictive block of a PU of the CU.

Transform processing unit 1004 may partition the residual blocks of a CU into transform blocks of TUs of the CU. For instance, transform processing unit 1004 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 1004 may generate transform coefficient blocks for each TU of a CU by applying one or more transforms to the transform blocks of the TU. Transform processing unit 1004 may apply various transforms to a transform block associated with a TU. For example, transform processing unit 1004 may apply a discrete cosine transform (DCT), a directional transform, or a conceptually similar transform to a transform block. In some examples, transform processing unit 1004 does not apply transforms to a transform block. In such examples, the transform block may be treated as a transform coefficient block.

Quantization unit 1006 may quantize the transform coefficients in a coefficient block. Quantization unit 1006 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 1008 and inverse transform processing unit 1010 may apply inverse quantization and inverse transforms to a coefficient block, respectively, to reconstruct a residual block from the coefficient block. Reconstruction unit 1012 may add the reconstructed residual block to corresponding samples from one or more predictive blocks generated by prediction processing unit 1000 to produce a reconstructed transform block associated with a TU. By reconstructing transform blocks for each TU of a CU in this way, video encoder 20 may reconstruct the coding blocks of the CU. In this way, video encoder 20 may decode pictures of the video data as part of the process of encoding pictures of the video data.

Filter unit 1014 may perform one or more deblocking operations to reduce blocking artifacts in the coding blocks associated with a CU. In some examples, filter unit 1014 applies the techniques of this disclosure as part of applying SAO or ALF. Decoded picture buffer 1016 may store the reconstructed coding blocks after filter unit 1014 performs the one or more deblocking operations on the reconstructed coding blocks. Inter-prediction processing unit 1020 may use a reference picture that contains the reconstructed coding blocks to perform inter prediction on PUs of other pictures. In addition, intra-prediction processing unit 1026 may use reconstructed coding blocks in decoded picture buffer 1016 to perform intra prediction on other PUs in the same picture as the CU.

Entropy encoding unit 1018 may receive data from other functional components of video encoder 20. For example, entropy encoding unit 1018 may receive coefficient blocks from quantization unit 1006 and may receive syntax elements from prediction processing unit 1000. Entropy encoding unit 1018 may perform one or more entropy encoding operations on the data to generate entropy-encoded data. For example, entropy encoding unit 1018 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 1018. For instance, the bitstream may include data that represents values of transform coefficients for a CU.

Inter-prediction processing unit 1020 may perform techniques of this disclosure. For example, video encoder 20 may decode a first picture of the video data, as described above. In this example, after decoding the first picture, inter-prediction processing unit 1020 may use reference pixels in the first picture to pad pixels outside a picture boundary of a second picture of the video data. In this example, the second picture is a different picture from the first picture (e.g., the first and second reference pictures may be in different access units or different layers) and the padded pixels are in a padding area surrounding the second picture. Inter-prediction processing unit 1020 and other components of video encoder 20 may then encode one or more blocks of the video data based on the padded pixels.

In some examples, during inter prediction of a current block of a current picture, inter-prediction processing unit 1020 may determine that a first reference block of a first reference picture of the video data includes one or more padded samples. In this example, the padded samples are samples that are outside a padding boundary of the first reference picture. In this example, responsive to determining that the first reference block includes one or more samples that are outside the padding boundary of the first reference picture, inter-prediction processing unit 1020 may use samples of a second reference block to derive values for the padded samples. In this example, the second reference block is in a second reference picture different from the first reference picture.

In some examples, inter-prediction processing unit 1020 derives a padding motion vector based on a motion vector of a boundary block. The boundary block is a block within the padding boundary of the first reference picture and adjacent to the padding boundary of the first reference picture. Furthermore, in this example, inter-prediction processing unit 1020 may use the padding motion vector to determine a second reference block in a second reference picture of the video data. The second reference picture is a different picture from the first reference picture. In this example, inter-prediction processing unit 1020 may use samples of the second reference block to derive values for the padded samples. Inter-prediction processing unit 1020 may use the padded samples to determine values in a predictive block of the current block.

Figure 11:
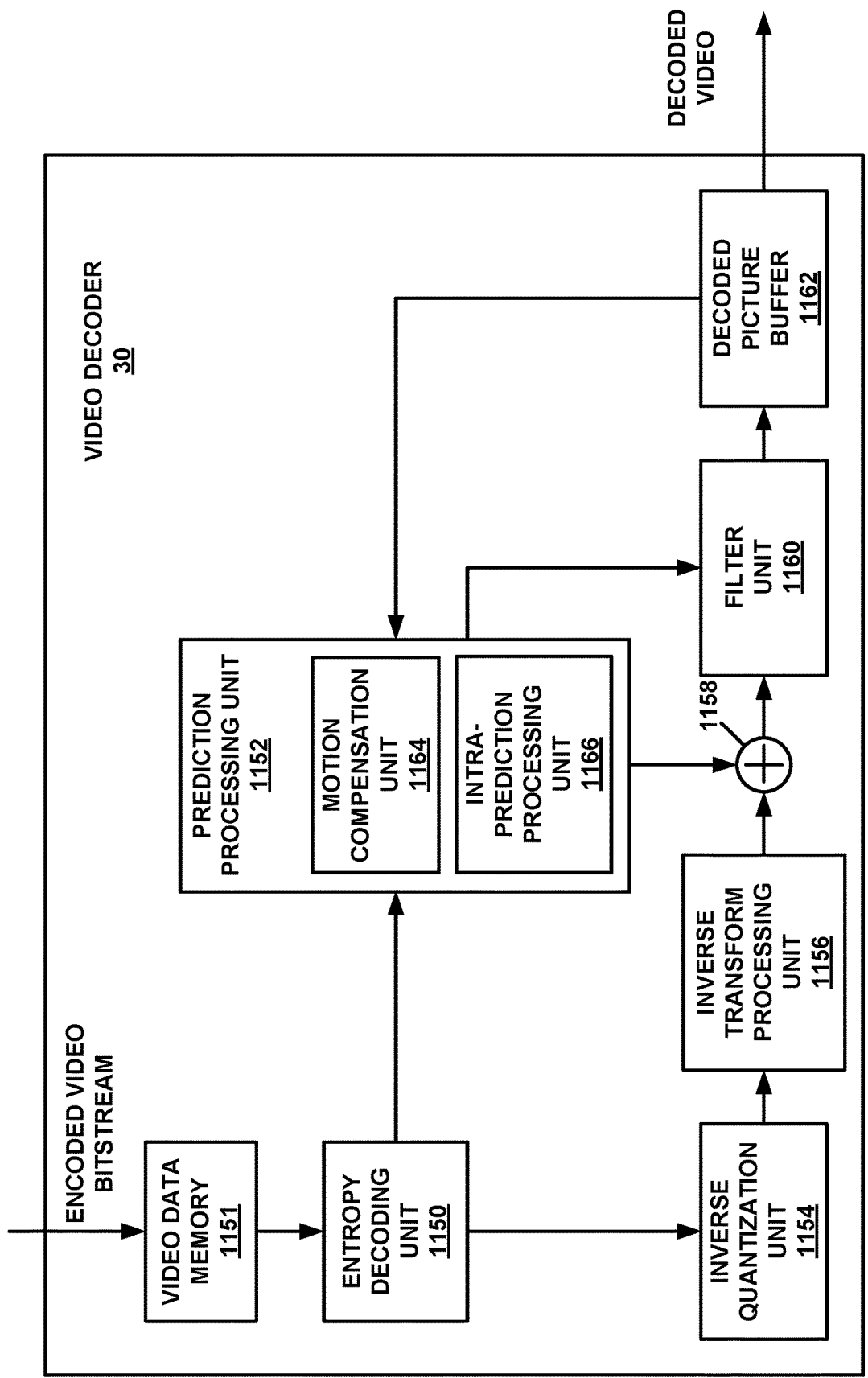
FIG. 11 is a block diagram illustrating an example video decoder that may implement one or more techniques described in this disclosure.

FIG. 11 is a block diagram illustrating an example video decoder 30 that is configured to implement the techniques of this disclosure. FIG. 11 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. Thus, video decoder 30 may comprise one or more processing circuits. For instance, video decoder 30 may include integrated circuitry, and the various units illustrated in FIG. 11 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 11 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 11, video decoder 30 includes an entropy decoding unit 1150, video data memory 1151, a prediction processing unit 1152, an inverse quantization unit 1154, an inverse transform processing unit 1156, a reconstruction unit 1158, a filter unit 1160, and a decoded picture buffer 1162. Prediction processing unit 1152 includes a motion compensation unit 1164 and an intra-prediction processing unit 1166. In other examples, video decoder 30 may include more, fewer, or different functional components.

Video data memory 1151 may store encoded video data, such as an encoded video bitstream, to be decoded by the components of video decoder 30. The video data stored in video data memory 1151 may be obtained, for example, from computer-readable medium 16, e.g., from a local video source, such as a camera, via wired or wireless network communication of video data, or by accessing physical data storage media. Video data memory 1151 may form a coded picture buffer (CPB) that stores encoded video data from an encoded video bitstream. Decoded picture buffer 1162 may be a reference picture memory that stores reference video data for use in decoding video data by video decoder 30, e.g., in intra- or inter-coding modes, or for output. Video data memory 1151 and decoded picture buffer 1162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 1151 and decoded picture buffer 1162 may be provided by the same memory device or separate memory devices. In various examples, video data memory 1151 may be on-chip with other components of video decoder 30, or off-chip relative to those components. Video data memory 1151 may be the same as or part of storage media 28 of FIG. 1.

Video data memory 1151 receives and stores encoded video data (e.g., NAL units) of a bitstream. Entropy decoding unit 1150 may receive encoded video data (e.g., NAL units) from video data memory 1151 and may parse the NAL units to obtain syntax elements. Entropy decoding unit 1150 may entropy decode entropy-encoded syntax elements in the NAL units. Prediction processing unit 1152, inverse quantization unit 1154, inverse transform processing unit 1156, reconstruction unit 1158, and filter unit 1160 may generate decoded video data based on the syntax elements extracted from the bitstream. Entropy decoding unit 1150 may perform a process generally reciprocal to that of entropy encoding unit 1018.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 1154 may inverse quantize, i.e., de-quantize, coefficient blocks associated with the TU. After inverse quantization unit 1154 inverse quantizes a coefficient block, inverse transform processing unit 1156 may apply one or more inverse transforms to the coefficient block in order to generate a residual block associated with the TU. For example, inverse transform processing unit 1156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 1166 may perform intra prediction to generate predictive blocks of the PU. Intra-prediction processing unit 1166 may use an intra prediction mode to generate the predictive blocks of the PU based on samples spatially-neighboring blocks. Intra-prediction processing unit 1166 may determine the intra prediction mode for the PU based on one or more syntax elements obtained from the bitstream.

If a PU is encoded using inter prediction, motion compensation unit 1164 may determine motion information for the PU. Motion compensation unit 1164 may determine, based on the motion information of the PU, one or more reference blocks. Motion compensation unit 1164 may generate, based on the one or more reference blocks, predictive blocks (e.g., predictive luma, Cb and Cr blocks) for the PU.

In accordance with some techniques of this disclosure, motion compensation unit 1164 may use reference pixels in a first picture to pad pixels outside a picture boundary of a second picture of the video data. In such examples, the second picture is a different picture from the first picture and the padded pixels may be in a padding area surrounding the second picture. In some examples, when video decoder 30 is decoding a current picture, motion compensation unit 1164 may determine that a first reference block of a first reference picture of the video data includes one or more padded samples. The padded samples are samples that are outside a padding boundary of the first reference picture. Additionally, in this example, responsive to determining that the first reference block includes one or more samples that are outside the padding boundary of the first reference picture, motion compensation unit 1164 may use samples of a second reference block to derive values for the padded samples. In this example, the second reference picture is a different picture from the first reference picture.

In some examples, responsive to determining that the first reference block includes one or more padded samples, motion compensation unit 1164 may derive a padding motion vector based on a motion vector of a boundary block. The boundary block is a block within the padding boundary of the first reference picture and adjacent to the padding boundary of the first reference picture. In this example, motion compensation unit 1164 may use the padding motion vector to determine a second reference block in a second reference picture of the video data. Furthermore, motion compensation unit 1164 may use samples of the second reference block to derive values for the padded samples.

Reconstruction unit 1158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 1158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 1160 may perform a deblocking operation to reduce blocking artifacts associated with the coding blocks of the CU. In some examples, filter unit 1160 applies the techniques of this disclosure as part of applying SAO or ALF. Video decoder 30 may store the coding blocks of the CU in decoded picture buffer 1162. Decoded picture buffer 1162 may provide reference pictures for subsequent motion compensation, intra prediction, and presentation on a display device, such as display device 32 of FIG. 1. For instance, video decoder 30 may perform, based on the blocks in decoded picture buffer 1162, intra prediction or inter prediction operations for PUs of other CUs.

Figure 12:
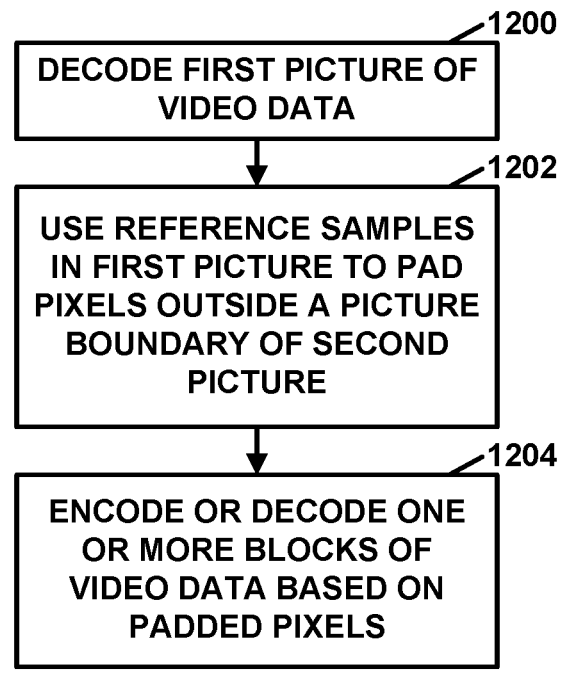
FIG. 12 is a flowchart illustrating an example operation that may be performed by a video encoder or video decoder in accordance with one or more techniques of this disclosure.

FIG. 12 is a flowchart illustrating an example operation that may be performed by video encoder 20 or video decoder 30 in accordance with one or more techniques of this disclosure. In the example of FIG. 12, a video coder (e.g., video encoder 20 or video decoder 30) may decode a first picture of the video data (1200). After decoding the first picture, the video coder may use reference pixels in the first picture to pad pixels outside a picture boundary of a second picture of the video data (1202). For instance, in the example of FIG. 5, the video coder may use pixels of sample block 514 to derive values for padded pixels 516. The second picture is a different picture from the first picture. The padded pixels are in a padding area surrounding the second picture. A picture boundary is a line that marks an outer limit of a picture as a whole.

As noted above, the video coder may use the reference pixels of the first picture to pad pixels of the second picture in various ways. For example, for each respective padded pixel of the padded pixels, the video coder may set a value of the respective padded pixel equal to a value of corresponding pixel of the first picture. A corresponding pixel of the first picture may be at a position in the first picture indicated by a padding motion vector taken to originate at a location of the respective padded pixel in the second picture.

In another example of how the video coder may use the pixels of the first picture to pad pixels of the second picture, for each respective padded pixel of the padded pixels, the video coder may set the value of the respective padded pixel equal to a value of a corresponding pixel of the first picture plus an offset. Thus, in this example, the video coder may derive values of the padded pixels as $P_i=R_i+\beta$, as described above, where $\beta$ is the offset.

In another example of how the video coder may use the pixels of the first picture to pad pixels of the second picture, for each respective padded pixel of the padded pixels, the video coder may set the value of the respective padded pixel equal to a value of a parameter multiplied by the value of a corresponding pixel of the first picture, plus an offset. Thus, in this example, the video coder may derive values of the padded pixels as $P_i=\alpha R_i+\beta$, where a is the parameter and $\beta$ is the offset.

As noted above, the video coder may use pixels of the first picture to pad pixels of a second frame. As part of doing so, the video coder may determine a padding motion vector based on a motion vector of a boundary block. The boundary block is a block within a padding boundary (e.g., picture boundary) of the second picture and adjacent to the padding boundary of the second picture. Furthermore, in this example, the video coder may use the padding motion vector to determine a reference block in the first picture. For instance, in the example of FIG. 5, the video coder may determine motion vector 510 of boundary block 508 and may use motion vector 510 to determine sample block 514.

In the example set forth above, the video coder may determine a padding motion vector based on a motion vector of a boundary block. The video coder may determine the padding motion vector based on the motion vector of the boundary block in various ways. For example, the video coder may set the padding motion vector equal to the motion vector of the boundary block. In another example, the motion vector of the boundary block may be considered a first motion vector of the boundary block and the first motion vector of the boundary block is one of a plurality of motion vectors of the boundary block. In this example, the video coder may determine the padding motion vector as a median or a weighted average of the plurality of motion vectors of the boundary block. In some examples, the video coder may determine the padding motion vector from a nearest motion vector of a block in a non-display region (e.g., non-display region 904 of FIG. 9) of the second picture. In other words, the video coder may determine a motion vector of a block in the non-display region that is closest to a pixel to be padded. Thus, in such examples, the boundary block may be a block in the non-display region of the second picture.

As noted above, the video coder may, in some examples, use the padding motion vector to determine a reference block in the first picture. The video coder may use the padding motion vector to determine the reference block in the first picture in various ways. For instance, in one example, based on the padding motion vector indicating a sub-pixel position in the second reference picture, the video coder may apply sub-pixel motion compensation to determine the pixels of the second reference block. For instance, the video coder may interpolate values of pixels in the second reference block based on pixels in the second reference picture.

Furthermore, in the example of FIG. 12, the video coder may encode or decode one or more blocks of video data based on the padded pixels (1204). For instance, in an example where the video coder is video encoder 20, the one or more blocks of the video data may include a current block of a third picture of the video data, the first picture may be considered a first reference picture with respect to the third picture, and the second picture may be considered a second reference picture with respect to the third picture. In this example, as part of encoding the one or more blocks, video encoder 20 may determine that a motion vector of the current block indicates a location within the second picture of a reference block that includes one or more of the padded pixels. In this example, video encoder 20 may determine pixels in a predictive block for the current block based on the padded pixels. Furthermore, in this example, video encoder 20 may use the predictive block for the current block to generate residual data for the current block. For example, video encoder 20 may generate the residual data by subtracting pixels in the predictive block from corresponding pixels of the current block.

In an example where the video coder is video decoder 30, the one or more blocks of the video data include a current block of a third picture of the video data, the first picture may be considered a first reference picture with respect to the third picture, and the second picture may be considered a second reference picture with respect to the third picture. In this example, as part of decoding the one or more blocks, video decoder 30 may determine that a motion vector of the current block indicates a location within the second picture of a reference block that includes one or more of the padded pixels. In this example, video decoder 30 may determine pixels in a predictive block for the current block based on the padded pixels. Additionally, in this example, video decoder 30 may use the predictive block for the current block to decode the current block. For example, video decoder 30 add pixels of the predictive block to corresponding pixels of residual data to reconstruct pixels of the current block, thereby decoding the current block.

In other examples of performing additional encoding or decoding steps using the padded pixels, the video coder may use the padded pixels to perform Sample Adaptive Offset (SAO) filtering and/or Adaptive Loop Filtering (ALF) for a current block of the second picture, as described elsewhere in this disclosure.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In this disclosure, ordinal terms such as "first," "second," "third," and so on, are not necessarily indicators of positions within an order, but rather may simply be used to distinguish different instances of the same or similar thing.

Various examples have been described. These and other examples are within the scope of the following claims.

What is claimed is:

1. A method of decoding video data, the method comprising:

decoding a first picture (N−2) of the video data;

after decoding the first picture (N−2), using reference pixels in the first picture to pad pixels outside a picture boundary of a second picture (N−1) of the video data, the second picture (N−1) being a different picture from the first picture, the padded pixels being in a padding area surrounding and outside the picture boundary of the second picture (N−1); and decoding a current block of a current picture (N) of the video data based on the padded pixels of the second picture (N−1).

2. The method of claim 1, wherein:

the first picture (N−2) is a first reference picture with respect to the current picture (N) and the second picture (N−1) is a second reference picture with respect to the current picture (N), and decoding the current block comprises:

determining that a motion vector of the current block indicates a location in the second reference picture of a reference block that includes one or more of the padded pixels;

determining pixels in a predictive block for the current block based on the padded pixels; and using the predictive block for the current block to decode the current block.

3. The method of claim 1, wherein using the reference pixels in the first picture (N−2) to pad the pixels comprises:

determining a padding motion vector based on a motion vector of a boundary block, wherein the boundary block is a block within the picture boundary of the second picture (N−1) and adjacent to the picture boundary of the second picture (N−1); and using the padding motion vector to determine a reference block in the first picture (N−2), the reference block including the reference pixels.

4. The method of claim 3, wherein determining the padding motion vector comprises setting the padding motion vector equal to the motion vector of the boundary block.

5. The method of claim 3, wherein:
the motion vector of the boundary block is a first motion vector of the boundary block,
the first motion vector of the boundary block is one of a plurality of motion vectors of the boundary block, and
determining the padding motion vector comprises determining the padding motion vector as a median or a weighted average of the plurality of motion vectors of the boundary block.

6. The method of claim 3, wherein using the padding motion vector to determine the reference block comprises, based on the padding motion vector indicating a sub-pixel position in the first picture (N−2), applying sub-pixel motion compensation to determine reference pixels of the reference block.

7. The method of claim 3, wherein determining the padding motion vector comprises determining the padding motion vector from a nearest motion vector of a non-display region of the second picture (N−1).

8. The method of claim 1, wherein using the reference pixels in the first picture (N−2) to pad pixels outside the picture boundary of the second picture (N−1) comprises one of:
for each respective padded pixel of the padded pixels, setting a value of the respective padded pixel equal to a value of a corresponding pixel of the first picture (N−2),
for each respective padded pixel of the padded pixels, setting the value of the respective padded pixel equal to the value of the corresponding pixel of the first picture (N−2) plus an offset, or
for each respective padded pixel of the padded pixels, setting the value of the respective padded pixel equal to a value of a parameter multiplied by the value of the corresponding pixel of the first picture (N−2), plus the offset.

9. The method of claim 1, wherein decoding the current block of the current picture (N) of the video data comprises using the padded pixels to perform Sample Adaptive Offset (SAO) filtering and/or Adaptive Loop Filtering (ALF) for a current block of the second picture (N−1).

10. A method of encoding video data, the method comprising:
decoding a first picture (N−2) of the video data;
after decoding the first picture, using reference pixels in the first picture (N−2) to pad pixels outside a picture boundary of a second picture (N−1) of the video data, the second picture (N−1) being a different picture from the first picture (N−2), the padded pixels being in a padding area surrounding and outside the picture boundary of the second picture (N−1); and
encoding a current block of a current picture (N) of the video data based on the padded pixels of the second picture (N−1).

11. The method of claim 10, wherein:
the first picture (N−2) is a first reference picture with respect to the current picture and the second picture (N−1) is a second reference picture with respect to the current picture, and decoding the current block comprises:
determining that a motion vector of the current block indicates a location in the second reference picture of a reference block that includes one or more of the padded pixels;
determining pixels in a predictive block for the current block based on the padded pixels; and
using the predictive block for the current block to generate residual data for the current block.

12. The method of claim 10, wherein using the reference pixels in the first picture (N−2) to pad the pixels comprises:
determining a padding motion vector based on a motion vector of a boundary block, wherein the boundary block is a block within the picture boundary of the second picture (N−1) and adjacent to the picture boundary of the second picture (N−1); and
using the padding motion vector to determine a reference block in the first picture (N−2), the reference block including the reference pixels.

13. The method of claim 12, wherein determining the padding motion vector comprises setting the padding motion vector equal to the motion vector of the boundary block.

14. The method of claim 12, wherein:
the motion vector of the boundary block is a first motion vector of the boundary block,
the first motion vector of the boundary block is one of a plurality of motion vectors of the boundary block, and
determining the padding motion vector comprises determining the padding motion vector as a median or a weighted average of the plurality of motion vectors of the boundary block.

15. The method of claim 12, wherein using the padding motion vector to determine the reference block in the first picture comprises, based on the padding motion vector indicating a sub-pixel position in the first picture (N−2), applying sub-pixel motion compensation to determine reference pixels of the reference block.

16. The method of claim 12, wherein determining the padding motion vector comprises determining the padding motion vector from a nearest motion vector of a non-display region of the second picture (N−1).

17. The method of claim 10, wherein using the reference pixels in the first picture (N−2) to pad pixels outside the picture boundary of the second picture (N−1) comprises one of:
for each respective padded pixel of the padded pixels, setting a value of the respective padded pixel equal to a value of a corresponding pixel in the first picture (N−2),
for each respective padded pixel of the padded pixels, setting the value of the respective padded pixel equal to the value of the corresponding pixel in the first picture (N−2) plus an offset, or
for each respective padded pixel of the padded pixels, setting the value of the respective padded pixel equal to a value of a parameter multiplied by the value of the corresponding pixel in the first picture (N−2), plus the offset.

18. The method of claim 10, further comprising using the padded pixels to perform Sample Adaptive Offset (SAO) filtering and/or Adaptive Loop Filtering (ALF) for a current block of the second picture (N−1).

19. An apparatus for encoding or decoding video data, the apparatus comprising:
one or more storage media configured to store the video data; and one or more processing circuits configured to:
- decode a first picture (N−2) of the video data;
- after decoding the first picture (N−2), use reference pixels in the first picture (N−2) to pad pixels outside a picture boundary of a second picture (N−1) of the video data, the second picture (N−1) being a different picture from the first picture (N−2), the padded pixels being in a padding area surrounding and outside the picture boundary of the second picture (N−1); and
- encode or decode a current block of a current picture (N) of the video data based on the padded pixels of the second picture (N−1).

20. The apparatus of claim 19, wherein:
the first picture (N−2) is a first reference picture with respect to the current picture and the second picture (N−1) is a second reference picture with respect to the current picture (N), and
the one or more processing circuits are configured to:
- determine that a motion vector of the current block indicates a location in the second reference picture of a reference block that includes one or more of the padded pixels;
- determine pixels in a predictive block for the current block based on the padded pixels; and
- perform at least one of:
  - using the predictive block for the current block to generate residual data for the current block, or
  - using the predictive block for the current block to decode the current block.

21. The apparatus of claim 19, wherein the one or more processing circuits are configured such that, as part of using the reference pixels in the first picture (N−2) to pad the pixels, the one or more processing circuits:
- determine a padding motion vector based on a motion vector of a boundary block, wherein the boundary block is a block within the picture boundary of the second picture (N−1) and adjacent to the picture boundary of the second picture (N−1); and
- use the padding motion vector to determine a reference block in the first picture (N−2), the reference block including the reference pixels.

22. The apparatus of claim 21, wherein the one or more processing circuits are configured such that, as part of determining the padding motion vector, the one or more processing circuits set the padding motion vector equal to the motion vector of the boundary block.

23. The apparatus of claim 21, wherein:
the motion vector of the boundary block is a first motion vector of the boundary block,
the first motion vector of the boundary block is one of a plurality of motion vectors of the boundary block, and
the one or more processing circuits are configured such that, as part of determining the padding motion vector, the one or more processing circuits determine the padding motion vector as a median or a weighted average of the plurality of motion vectors of the boundary block.

24. The apparatus of claim 21, wherein the one or more processing circuits are configured such that, as part of using the padding motion vector to determine the reference block, the one or more processing circuits apply, based on the padding motion vector indicating a sub-pixel position in the first picture (N−2), sub-pixel motion compensation to determine reference pixels of the reference block.

25. The apparatus of claim 21, wherein the one or more processing circuits are configured such that, as part of determining the padding motion vector, the one or more processing circuits determine the padding motion vector from a nearest motion vector of a non-display region of the second picture (N−1).

26. The apparatus of claim 19, wherein the one or more processing circuits are configured such that, as part of using the reference pixels in the first picture (N−2) to pad pixels outside the picture boundary of the second picture (N−1), the one or more processing circuits perform one of:
- for each respective padded pixel of the padded pixels, setting a value of the respective padded pixel equal to a value of a corresponding pixel of the first picture (N−2),
- for each respective padded pixel of the padded pixels, setting the value of the respective padded pixel equal to the value of the corresponding pixel of the first picture (N−2) plus an offset, or
- for each respective padded pixel of the padded pixels, setting the value of the respective padded pixel equal to a value of a parameter multiplied by the value of the corresponding pixel of the first picture (N−2), plus the offset.

27. The apparatus of claim 19, wherein the one or more processing circuits are configured such that, as part of encoding or decoding the current block of the current picture of the video data, the one or more processing circuits use the padded pixels to perform Sample Adaptive Offset (SAO) filtering and/or Adaptive Loop Filtering (ALF) for a current block of the second picture (N−1).

28. The apparatus of claim 19, wherein the apparatus comprises:
an integrated circuit,
a microprocessor, or
a wireless communication device.

29. A computer-readable storage medium having instructions stored thereon that, when executed, cause one or more processing circuits to:
- decode a first picture (N−2) of video data;
- after decoding the first picture (N−2), use reference pixels in the first picture (N−2) to pad pixels outside a picture boundary of a second picture (N−1) of the video data, the second picture (N−1) being a different picture from the first picture (N−2), the padded pixels being in a padding area surrounding and outside the picture boundary of the second picture (N−1); and
- encode or decode a current block of a current picture (N) of the video data based on the padded pixels of the second picture (N−1).

30. The computer-readable storage medium of claim 29, wherein:
the first picture (N−2) is a first reference picture with respect to the current picture and the second picture (N−1) is a second reference picture with respect to the current picture, and
the one or more processing circuits are configured to:
- determine that a motion vector of the current block indicates a location in the second picture (N−1) of a reference block that includes one or more of the padded pixels;
- determine pixels in a predictive block for the current block based on the padded pixels; and perform at least one of:
  using the predictive block for the current block to generate residual data for the current block, or
  using the predictive block for the current block to decode the current block.

\* \* \* \* \*